(12) United States Patent
Chen

(10) Patent No.: US 8,462,006 B2
(45) Date of Patent: Jun. 11, 2013

(54) GFCI WITH OVERCURRENT PROTECTION AND END-OF-LIFE WARNING AND TRIPPING FUNCTIONS

(76) Inventor: Gui Chen, Yueqing (CN)

( * ) Notice: Subject to any disclaimer, the term of this patent is extended or adjusted under 35 U.S.C. 154(b) by 427 days.

(21) Appl. No.: 12/896,964

(22) Filed: Oct. 4, 2010

(65) Prior Publication Data

US 2012/0032813 A1    Feb. 9, 2012

(30) Foreign Application Priority Data

Aug. 9, 2010    (CN) .................. 2010 1 0251604.5

(51) Int. Cl.
*G08B 21/00*    (2006.01)
(52) U.S. Cl.
USPC .............. 340/649; 340/635; 361/42; 324/509
(58) Field of Classification Search
USPC ...... 340/540, 635, 649, 650, 652; 361/42–50; 324/509
See application file for complete search history.

(56) References Cited

U.S. PATENT DOCUMENTS

2007/0279814 A1 *  12/2007  Bonilla et al. ................. 361/42
2008/0002314 A1 *   1/2008  Batko et al. ................... 361/42

* cited by examiner

*Primary Examiner* — Jeffery Hofsass
(74) *Attorney, Agent, or Firm* — Mei & Mark LLP

(57) ABSTRACT

The invention relates to a GFCI that trips and provides indication at the end of its life. It comprises a leakage signal detection circuit (LSDC) and a failure alarm for providing indication in case of failure. The LSDC includes a leakage signal amplification circuit (LSAC) which amplifies the signal from test and neutral toroidal coils and controls a mechanical tripping mechanism through a silicon control unit and an igniter. The mechanical tripping mechanism is controlled by the LSDC through the silicon control unit by a forcible tripping coil connected thereto. This LSDC is powered by a power unit. Additionally, a failure alarm circuit which triggers and supplies visual indication through an optical display element in the event of failure is connected to the power unit of the LSDC. This alarm circuit also includes a forcible tripping coil to control the mechanical tripping mechanism at the end of the device life.

19 Claims, 19 Drawing Sheets

GFCI WITH OVERCURRENT PROTECTION AND END-OF-LIFE WARNING AND TRIPPING FUNCTIONS

This application claims the benefit of priority of Chinese patent application 201010251604.5, filed Aug. 9, 2010, the content of which is incorporated herein by reference in its entirety.

TECHNICAL FIELD

The present disclosure relates generally to ground fault circuit interrupters (GFCI), also known as ground fault interrupters (GFI). More specifically, to GFCI or GFI with overcurrent protection features and end-of-life warning and tripping features.

BACKGROUND

The existing ground fault circuit interrupter (GFCI) usually includes a pedestal, an upper cover with jacks, a leakage signal detection circuit, a mechanical tripping protection mechanism that is controlled by the leakage signal detection circuit, a contactor assembly, a grounding assembly, a power input connection assembly, a load connection assembly, etc. The GFCI can provide a load with a power supply not only through the socket holes on the upper cover but also through the load connection assembly. The leakage signal detection circuit has a leakage signal amplification integrated circuit as a core. A rectification bridge and an RC filter circuit provide the control circuit with DC power supply. The control output end of the leakage signal amplification integrated circuit is connected to the igniter of the tripping silicon control SCR1. The tripping silicon control SCR1 is connected in series in the power supply circuit of the tripping coil T3. The power supply wires L and N pass through a test toroidal coil T1 and a neutral toroidal coil T2. The output ends of the test toroidal coil T1 and the neutral toroidal coil T2 are connected to the leakage signal amplification integrated circuit.

Under normal conditions, the currents in the power supply wires L and N shall be equal. Once a leakage accident occurs, a difference is generated between the currents in the power supply wires L and N. The induction coil in the leakage protection device monitors the current difference and converts it into voltage signals, which are amplified by the leakage signal amplification integrated circuit and then outputted. Once the difference is more than a preset threshold value, the output control signal will cause the tripping mechanism to trip, cutting off the connection between the load power consuming equipment and the power supply wire so realizing the protection function.

However, the traditional GFCI does not have a protection function in the end of life period. That is to say, when any element in the GFCI is damaged, causing the life of the interrupter to come to an end, there is no appropriate reaction to warn the user that the GFCI has lost its neutral line leakage protection function and should be replaced. The traditional GFCI does not cut off the power supply in the load side forcibly. And, the user may believe mistakenly that it still functions. Once leakage occurs, there may be a risk of electric shock resulting in personal injury or property damage.

SUMMARY

The purpose of this invention is to overcome the shortage of the existing technology and to present a GFCI with coil open-circuit failure indication function that can indicate the failure when open-circuit condition occurs in any internal element especially in the tripping coil.

In one embodiment, a ground fault interrupter trips at its end-of-life and emits an end-of-life warning. The interrupter comprises a live load power supply line, a neutral load power supply line, a power unit comprising a rectifier and a filter, and a tripping coil and a fuse connected in series to the rectifier. A leakage signal detection circuit of the interrupter comprises a test toroidal coil, a neutral toroidal coil, and a leakage signal amplification circuit. A tripping silicon control has at least one igniter connection and at least one other connection. The igniter connection connects to the leakage signal amplification circuit and the at least one other connection connects in series to the power supply circuit of the tripping coil. A mechanical forcible tripping mechanism connects to the leakage signal detection circuit. A forcible tripping circuit controls the mechanical forcible tripping mechanism. The forcible tripping circuit comprises a forcible tripping coil connected in series with a forcible tripping silicon control, which is connected to the live load power supply line and the neutral load power supply line. The interrupter also comprises a mechanical protection tripping mechanism, an interlock mechanism between the mechanical protection tripping mechanism and the mechanical forcible tripping mechanism, and a failure alarm circuit comprising a half-wave rectification filter circuit, a switch triode, and an optical display element. The power unit is configured to receive AC power from an AC power supply and to supply DC power through full wave rectification by the rectifier and filtration by the filter. The power unit supplies power to the leakage signal amplification circuit. The test toroidal coil and the neutral toroidal coil are connected to the leakage signal amplification circuit. The failure alarm circuit is connected to the DC output of the power unit. And, the forcible tripping coil is connected in series to the live load power supply line and the neutral load line power supply line.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION

Figure 1:
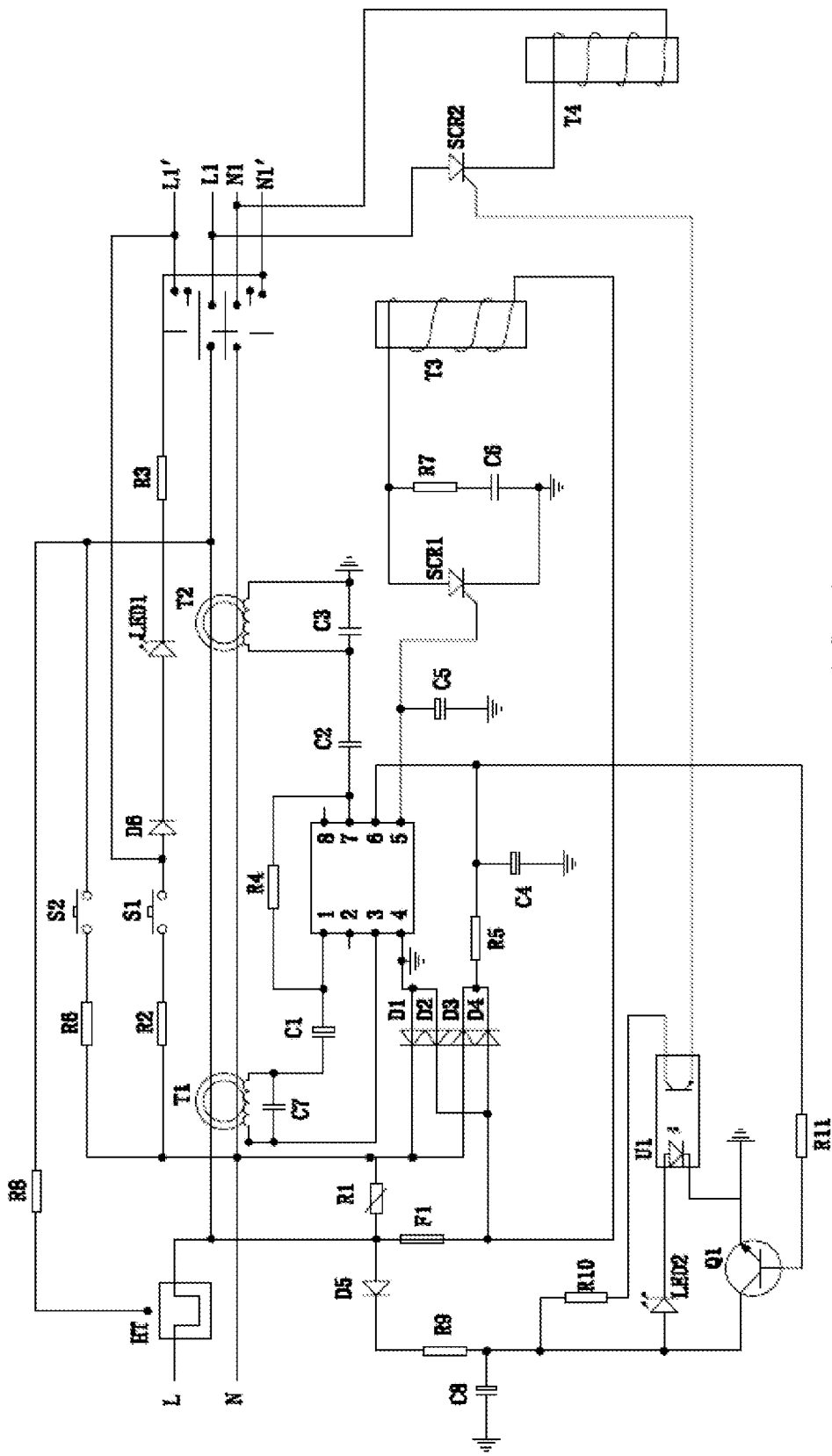
FIG. 1 is an example of an electronic wiring schematic for a GFCI with overcurrent protection and end-of-life warning and tripping functions.

Reference will now be made in detail to the present exemplary embodiments, examples of which are illustrated in the accompanying drawings. Wherever possible, the same reference numbers will be used throughout the drawings to refer to the same or like parts.

A ground fault circuit interrupter (GFCI) or ground fault interrupter (GFI) with overcurrent protection and end-of-life automatic tripping and warning functions includes, among other parts, an enclosure, a leakage signal detection circuit, a mechanical protection tripping mechanism which acts as controlled by the leakage signal detection circuit, a forcible tripping mechanism, a failure alarming circuit, a contactor assembly, a grounding assembly, a power input connection assembly, a load connection assembly.

As shown in FIGS. 3-7, the GFCI with overcurrent protection and end-of-life automatic tripping and warning functions is generally a rectangular solid. The enclosure is divided into two parts, i.e. a pedestal 3 and an upper cover 5 with jacks 6. A middle frame 4 is provided between pedestal 3 and upper cover 5. On upper cover 5, two groups of socket jacks 6, one resetting key 1 and one test key 2 are provided.

In the inner cavity of pedestal 3, a base plate 16 made of a printed circuit is provided. The elements in the leakage signal detection circuit are generally mounted on the base plate 16. The mechanical protection tripping mechanism includes a resetting bar 17, a resetting spring 18, a resetting bracket 19, a reverse elastic supporting mechanism, and an electromagnetic actuator with a latch piece 24. The upper end of resetting bar 17 is fixed to resetting key 1. An annular latch groove is provided close to the lower end of resetting bar 17. Located below the middle frame 4, the resetting bracket 19 is a tubular component with bracket arms 191 extending symmetrically to the two sides. The arms for connecting the left and right movable contact pieces 20 and 21 in the power input side and in the output load power supply side are located on the bracket arms 191 at the left and right ends of resetting bracket 19 respectively.

The upper part of the resetting bar 17 is covered with a resetting spring 18, and the lower part penetrates middle frame 4. The two ends of resetting spring 18 rest respectively against resetting key 1 and middle frame 4. The lower part of the resetting bar 17 is covered with intermediate spring 22, and then is inserted into resetting bracket 19. The two ends of intermediate spring 22 are rested against the inner wall shoulders of middle frame 4 and resetting bracket 19. Intermediate spring 22 is provided to adjust the balance of the contact force at the contact point of the switch mechanism.

Resetting bar 17 fits movably into, and inserts into, the center through-hole of resetting bracket 19. The lower end of resetting bracket 19 is fixed to a vertically downward guide post 192. On the base plate 16, which is at the corresponding position directly below guide post 192, a guide hole is provided with its diameter matching moveably with the through-hole of guide pole 192. The said guide pole 192 is covered with reverse spring 23, and the back end is inserted into the said guide hole to form a reverse elastic supporting mechanism. The said reverse elastic supporting mechanism is provided coaxially with resetting bar 17 and resetting bracket 19, forming an elastic resetting mechanism or an elastic floating support to resetting bracket 19. This allows resetting bracket 19 to be able to move axially within a certain range under the guidance of the said guide hole and resetting bar 17.

The electromagnetic actuator includes a tripping coil bracket 25, a tripping coil 26, a tripping iron core 27, and an iron core spring 28. The axis of the electromagnetic actuator is perpendicular to that of the elastic resetting mechanism and is located in one side of the resetting bracket 19. After tripping coil bracket 25 is wound to the tripping coil, it is fixed horizontally on base plate 16. Tripping coil bracket 25, in the end facing to the edge of base plate 16, is provided with a U-shaped pure iron piece. The U-shaped pure iron piece is clamped outside tripping coil bracket 25 to form a magnetic path. After tripping iron core 27 is covered with iron core spring 28, it can, from the other end, insert movably into the center axial hole of tripping coil bracket 25.

Tripping iron core 27 is provided with an annular groove at the end facing resetting bracket 19. The said latch piece 24, at the end facing tripping iron core 27, is provided with a notch to match the annular groove. As the position of latch piece 24 is vertically higher than that of tripping iron core 27, in this implementation example, latch piece 24 is bent into a box-like shape or L-shape. The notch is blocked on the annular groove, so the notch and the annular groove form a linkage with tripping iron core 27.

Resetting bracket 19 is also provided with a notch slightly wider than latch piece 24 and the notch is perpendicular to the center axis of resetting bracket 19. The other end of latch piece 24 inserts into the slightly wider notch of resetting bracket 19. On the latch piece 24 part of the said resetting bracket 19, a long circular hole with a diameter slightly larger than resetting bar 17 is provided to form a bayonet socket. The long circular hole can slide back and forth in the notch under the traction of tripping iron core 27. The back-and-forth sliding displacement should make the position of the bayonet switch over between aligning and misaligning with the end of resetting bar 17. The bayonet and the long circular hole form a lock structure.

The tripping process of the mechanical protection tripping mechanism is as follows: When tripping coil 26 is energized and is in a working status, tripping iron core 27 acts to pull latch piece 24, making the bayonet of latch piece 24 disengage out of the lock groove. The locked resetting bar 17 is released. Resetting key 1 and resetting bar 17 move upward under the action of the elastic restoring force of resetting spring 18 and move into a tripped status position. While at this moment, the contacts of left and right movable contact pieces 20 and 21, under the lifting action of bracket arms 191 at the left and right ends of resetting bracket 19, are apart from the static contacts on the static contact pieces. This lifting realizes the disengagement of the GFCI and cuts off the power output.

Figure 6:
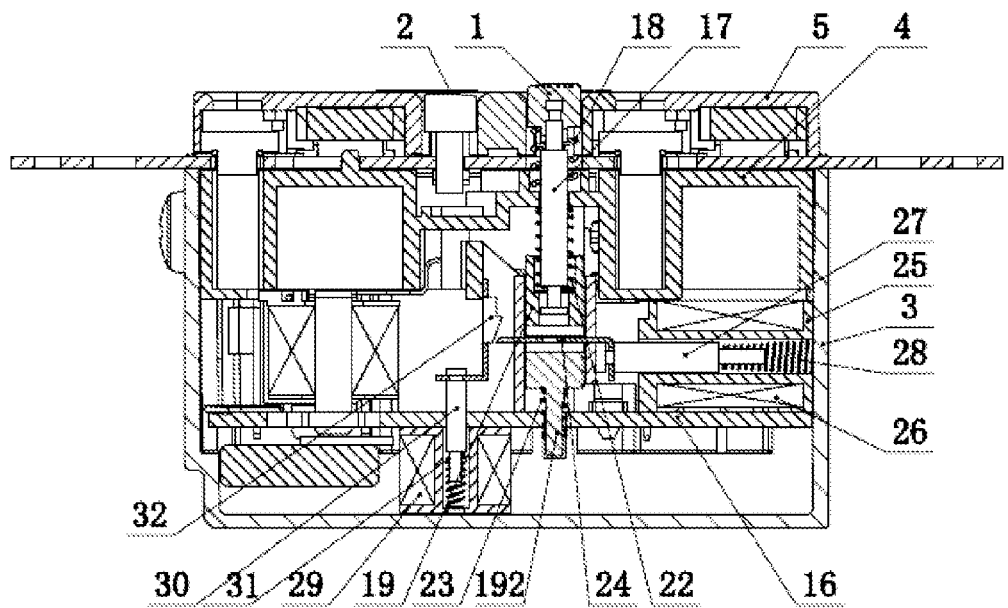
FIG. 6 is an internal view of an alternative exemplary tripping mechanism.
Figure 7:
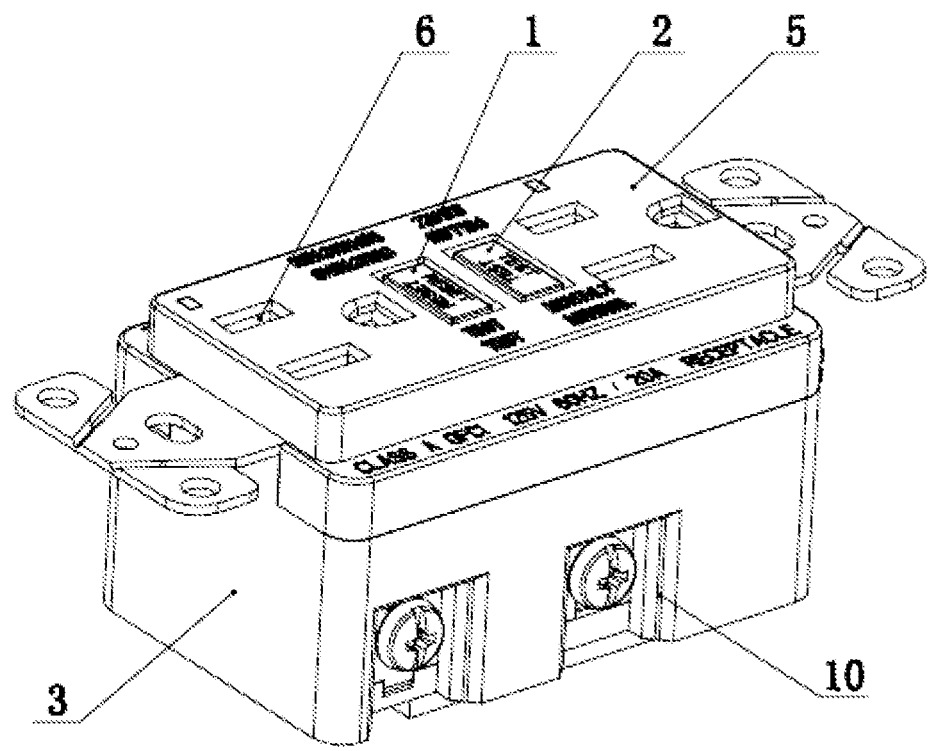
FIG. 7 is an example of a 15 A GFCI configured with 15 A socket jacks.

The mechanical forcible tripping mechanism is provided on resetting bracket 19 in the side contrary to the electromagnetic actuator. The mechanical forcible tripping mechanism includes a forcible tripping coil 29, a forcible tripping iron core 30, a forcible tripping iron core resetting spring 31, and a pulling piece 32. The forcible tripping iron core 30 can be provided moveably in the center of forcible tripping coil 29. In this embodiment, as shown in FIG. 6, the axial direction of the forcible tripping iron core 30 is perpendicular to the sliding direction of latch piece 24. The pulling piece 32 is fixed to the upper end of forcible tripping iron core 30. Pulling piece 32 is provided with a slant, which is located in front of the moving direction of latch piece 24.

When forcible tripping coil 29 is energized, it attracts forcible tripping iron core 30 to move downwards. The slant on pulling piece 32 pushes latch piece 24 to move horizontally, making the bayonet of latch piece 24 disengage from the lock groove and trip. So, mechanical forcible tripping mechanism forms an interlock mechanism that allows the mechanical protection tripping mechanism to trip.

Figure 5:
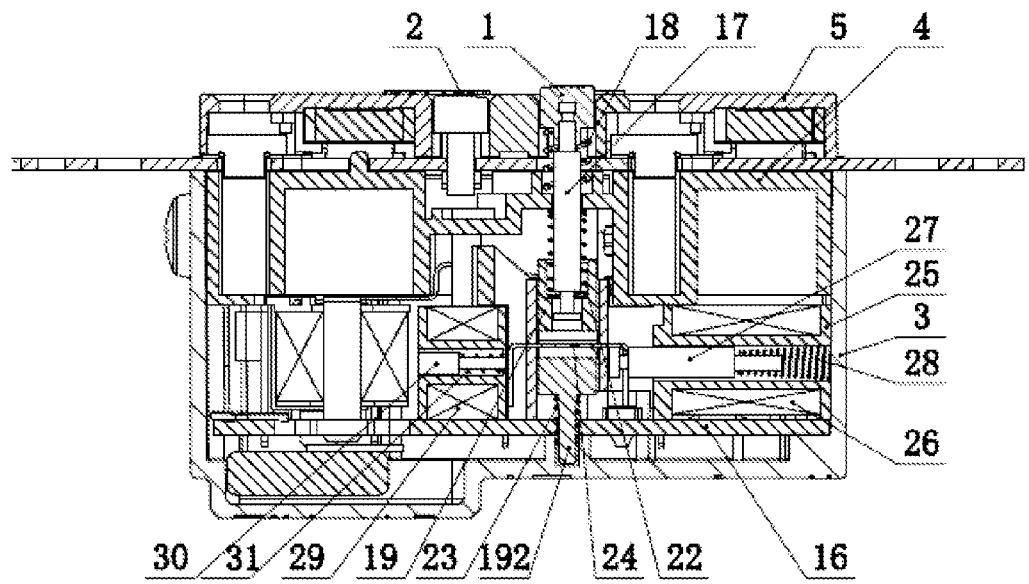
FIG. 5 is an internal view of an exemplary tripping mechanism.

As shown in FIG. 5, the mechanical forcible tripping mechanism can also be provided on resetting bar 17 in the side contrary to the mechanical protection tripping mechanism. This embodiment of mechanical forcible tripping mechanism includes forcible tripping coil 29, forcible tripping iron core 30, and forcible tripping iron core resetting spring 31. The forcible tripping iron core 30 can be provided moveably in the center of forcible tripping coil 29. The axial direction of the forcible tripping iron core 30 is parallel with the sliding direction of latch piece 24, and the forcible tripping iron core 30 is opposite to the end of latch piece 24. The distance from the end of latch piece 24 to the forcible tripping coil is within the sliding displacement range of forcible tripping iron core 30. When forcible tripping coil 29 is energized, it attracts forcible tripping iron core 30 to slide horizontally, bumping latch piece 24 to make the bayonet of latch piece 24 disengage from the lock groove and trip. So, this embodiment of a mechanical forcible tripping mechanism also forms an interlock that allows the mechanical protection tripping mechanism to trip.

As shown in FIG. 1, the circuit part of the GFCI with overcurrent protection and end-of-life automatic tripping and warning functions comprises a leakage signal detection circuit, which includes a test toroidal coil T1, a neutral toroidal coil T2 and a leakage signal amplification circuit with a leakage signal amplification integrated circuit as the core. The rectifier, shown here as rectification bridge D1-D4, and RC filter circuit provide the leakage signal detection circuit with DC power supply. In this example, an RV4145 integrated circuit is selected for the leakage signal amplification circuit, though another leakage signal amplification circuit may be used.

Two power wires both penetrate test toroidal coil T1 and neutral toroidal coil T2. The output ends of test toroidal coil T1 and neutral toroidal coil T2 are connected to the leakage signal amplification integrated circuit RV4145. The control output end of the leakage signal amplification integrated circuit RV4145 is connected with the igniter of tripping silicon control SCR1. To improve anti-interference performance and to prevent mistaken triggering, an anti-interference capacitor C5 is connected in parallel between the igniter and the negative pole of tripping silicon control SCR1. The tripping silicon control SCR1 is connected in series in the power supply circuit of the electromagnetic tripping coil T3. In the circuit diagrams of FIGS. 1 and 2, the electromagnetic tripping coil T3 is shown in place of tripping coil 26. The electromagnetic tripping coil T3, along with the fuse F1, is connected in series to the AC side of the rectification bridge.

The GFCI is also provided with a forcible tripping mechanism and failure alarming circuit. The forcible tripping mechanism includes a forcible tripping circuit and the mechanical forcible tripping mechanism controlled by the forcible tripping circuit. The forcible tripping circuit, as shown in the circuit diagram of FIGS. 1 and 2, includes a forcible tripping silicon control SCR2 that is connected to activate a forcible tripping coil T4. The forcible tripping coil T4, shown in place of forcible tripping coil 29, is connected in series with the forcible tripping silicon control SCR2, and then is connected to the load side power supply lines L1 and N1.

The failure alarming circuit includes a half-wave rectification filter circuit composed of diode D5, resistor R9, and capacitor C8. A switch triode Q1 is connected between the rectification power supplies. An optical display element, shown here as light-emitting diode LED2, is connected in parallel between the collector and emitter of switch triode Q1, and the series arm of the optical coupling element. The base pole of the switch triode Q1 is connected with the DC power supply of the leakage signal detection circuit through current-limiting resistor R11. The output of the optical coupling element is connected with the igniter of the forcible tripping silicon control SCR2. An interlock mechanism, which can comprise pulling piece 32, for making the mechanical protection tripping mechanism trip is provided between the mechanical forcible tripping mechanism and the mechanical protection tripping mechanism.

As shown in FIG. 1, the optical coupling element can be a photocoupler U1. The input end of photocoupler U1 connects with the light-emitting diode LED2 in series, and then photocoupler U1 and light-emitting diode LED2 connect in parallel between the collector and emitters of a switch triode. One end of the output side of photocoupler U1 is connected through current-limiting resistor R11 to the half-wave rectification power supply, and the other end of the output side of photocoupler U1 is connected with the igniter of forcible tripping silicon control SCR2.

Figure 2:
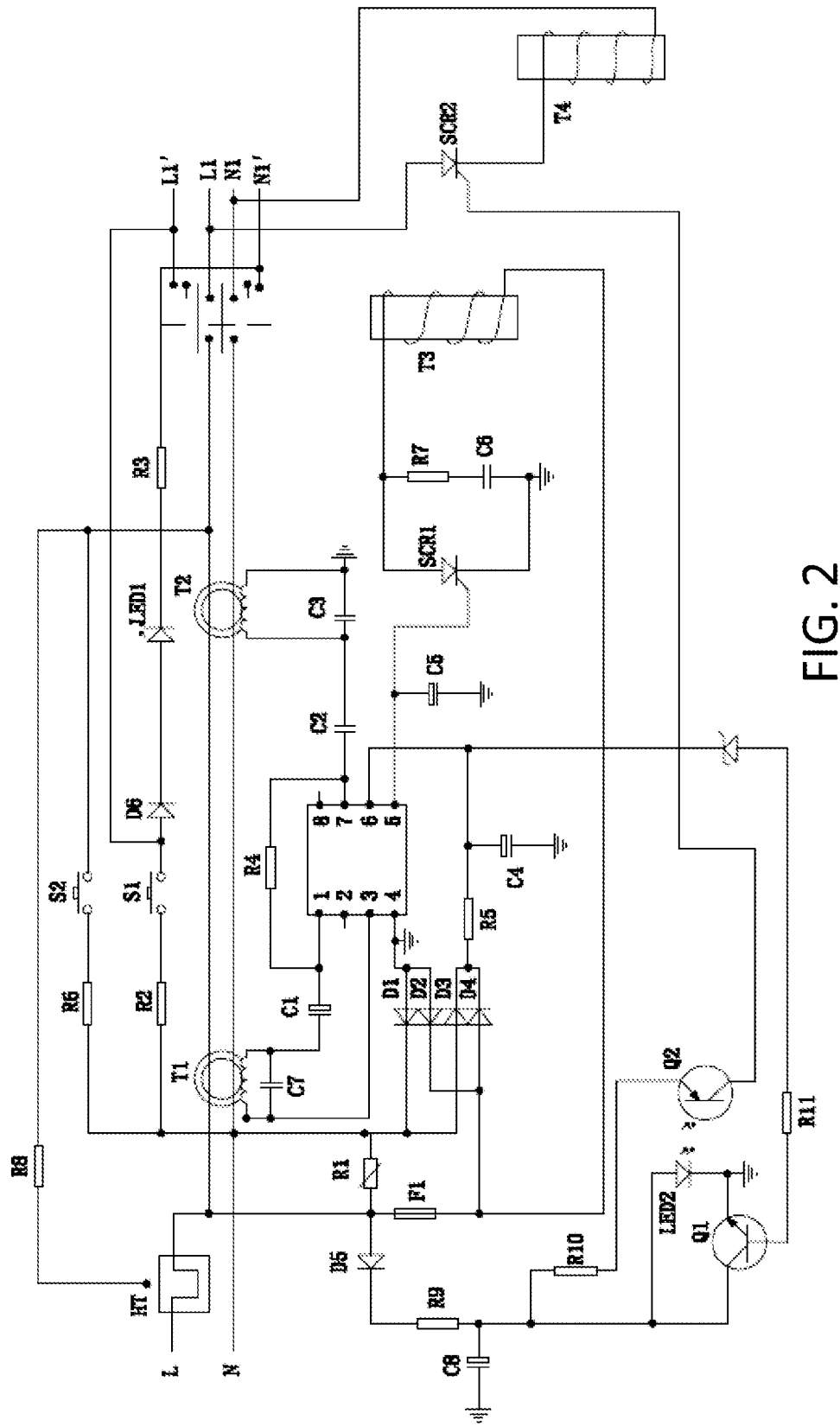
FIG. 2 is a second example of an electronic wiring schematic for a GFCI with overcurrent protection and end-of-life warning and tripping functions.

In addition to the above example, as shown in FIG. 2, the optical coupling element can also be composed of a light-emitting diode and a photocell. The light-emitting diode LED2 is connected in parallel between the collector and emitter of switch triode Q1. One end of the photocell is connected through current-limiting resistor R11 to the half-wave rectification power supply, and the other end is connected with the of igniter of forcible tripping silicon control SCR2. The light-emitting diode LED2 also acts as a warning indicator.

To provide an overcurrent protection function, the GFI is also provided with an overcurrent protection circuit. The overcurrent protection circuit includes a bimetal HT connected in series in the main circuit, a mechanical contact, and a current-limiting resistor. The mechanical contact and current-limiting resistor are connected in series, and then are bridged over the main circuit in the outer side of test toroidal coil T1 and neutral toroidal coil T2. Namely, one end is connected to the power supply wire before it penetrates test toroidal coil T1 and neutral toroidal coil T2, while the other end is connected to the power supply wire after it penetrates test toroidal coil T1 and neutral toroidal coil T2. The mechanical contact is provided near the bimetal so that the bimetal, when being deformed due to heat, is near enough to make the mechanical contact close. In this way, when the working current exceeds the rated value, the bimetal is heated and deformed, pushing the mechanical contact to close. A simulated leakage current is formed to cause the GFI to trip, protecting the safety of the user's life and property. After the failure is removed and the working current recovers to a normal level, the bimetal recovers to the original condition, the mechanical contact is open again, and the GFI can work normally.

The working principles of the circuit are as follows:

Power flows from the L (live wire, or hot wire) end or N (zero wire, or neutral wire) end of the commercial power, through fuse F1 to tripping coil T3 and to the anode of tripping silicon control SCR1. When there is a triggering signal at the tripping silicon control SCR1, the current flows through the silicon control cathode to the positive pole of the bridge rectification diode D1, and then to the N (zero wire) end or L (live wire) end of the commercial power. The main current circuit is so formed.

When the GFI detects no grounding failure, the 5th pin of the leakage signal amplification integrated circuit RV4145 will not give a triggering signal, the triggering tripping silicon control SCR1 is cut off, no sufficient current flows through tripping coil T3, the mechanical protection tripping mechanism does not act, and there is power at the output end of the GFI.

When the GFI detects any grounding failure and the failure current achieves the preset threshold value, the 5th pin of the leakage signal amplification integrated circuit RV4145 will give a triggering signal, the triggering tripping silicon control SCR1 is broken over, a relatively large current flows through tripping coil T3, the magnetic field generated causes the mechanical protection tripping mechanism to act to make the GFI trip, and the connection between the commercial power and the load is cut off.

When failure occurs at the internal elements of the GFI (e.g. short-circuit failure occurs at any assembly in the main circuit or the power supply circuit of the leakage signal amplification integrated circuit RV4145) and causes the current in the circuit to be higher than the fusing value of fuse F1, fuse F1 will fuse. After F1 fuses, the current in the main circuit and the power supply circuit of the leakage signal amplification integrated circuit RV4145 will be zero. Therefore, the voltage at the 6th pin of the leakage signal amplification integrated circuit RV4145 is 0 Volts. When the voltage at the 6th pin of the integrated circuit is 0V, the output of switch triode Q1 is at a high level, and the warning light-emitting diode LED2 is illuminated as current flows through it, indicating the end of the life of the GFI. The light-emitting diode LED2 shall preferably be red in order to have a special warning property.

When current flows through the warning light-emitting diode LED2, current also flows through the input end of the photocoupler U1 connected in series with LED2. So, the output end of photocoupler U1 is broken over. The triggering current, having been subjected to voltage reduction through resistor R10, flows through the output end of photocoupler U1 to trigger forcible tripping silicon control SCR2. The forcible tripping silicon control SCR2 is broken over, allowing current to flow through forcible tripping coil T4 and to generate a relatively high magnetic field. This makes the mechanical forcible tripping mechanism act to cause the mechanical protection tripping mechanism to trip, forcibly cutting off the power supply at the load side and eliminating the hidden safety trouble.

Similarly, if any open-circuit failure occurs in the power supply circuit of the leakage signal amplification integrated circuit RV4145 and causes the power supply circuit of the leakage signal amplification integrated circuit RV4145 to be open-circuit, or if an open-circuit or a short-circuit occurs at the leakage signal amplification integrated circuit RV4145 itself, or if an open-circuit occurs at the assemblies (e.g. tripping coil T3, resistor R5) or circuits, or if a short-circuit occurs in the rectification circuit D1-D4 or in capacitor C4, the power voltage at the 6th pin of the leakage signal amplification integrated circuit RV4145 will be 0V. This will cause the warning light-emitting diode LED2 to be illuminated. The mechanical forcible tripping mechanism will act to cause the mechanical protection tripping mechanism to trip, forcibly cutting off the power supply at the load side and reminding the user to make necessary maintenance or replacement measures.

Figure 8:
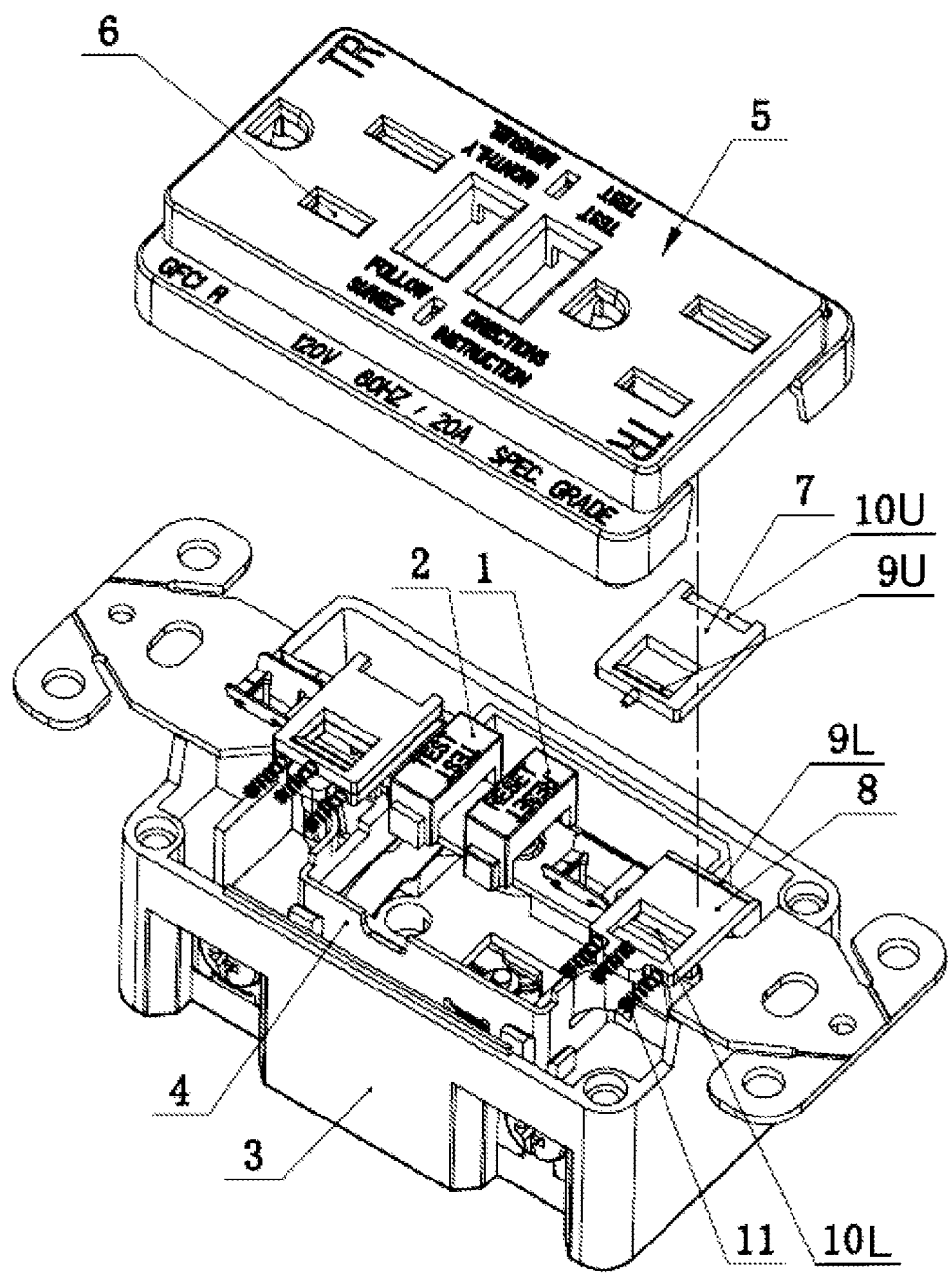
FIG. 8 is another view of an exemplary 15 A GFCI configured with 15 A socket jacks also having a first configuration of safety gate mechanisms.
Figure 9:
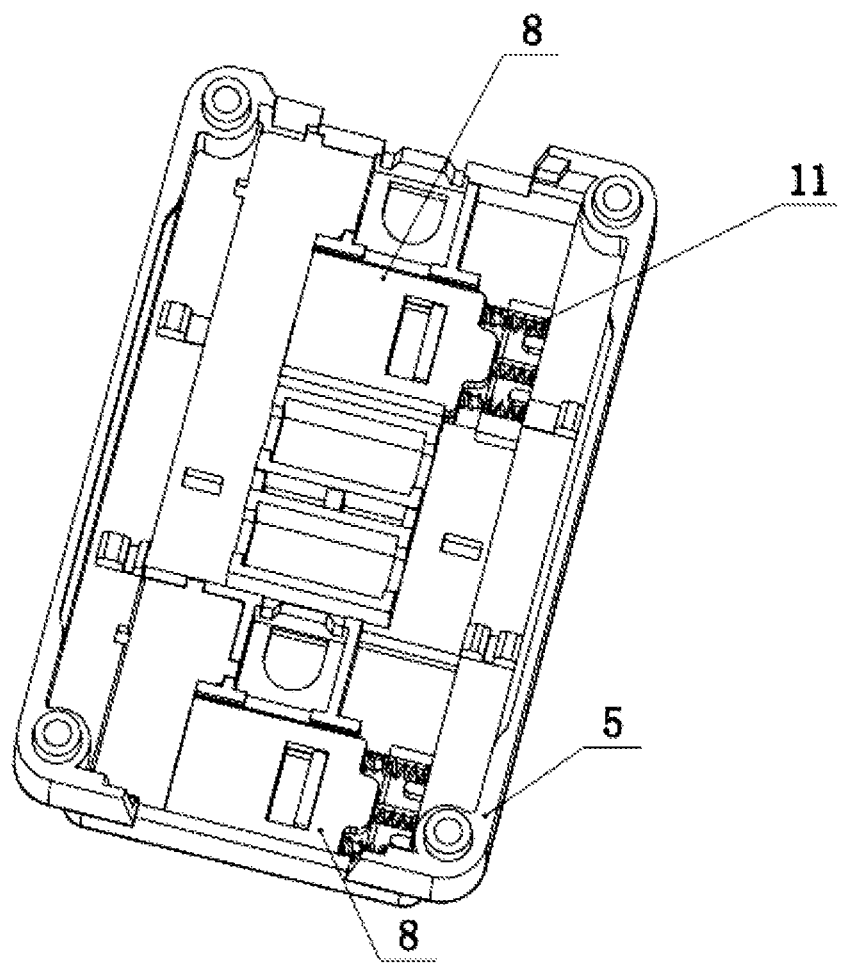
FIG. 9 is a view of a 15 A GFCI with a bottom cover plate removed and with a first configuration of safety gate mechanisms installed.

To prevent an electric shock accident caused by a child who pokes the socket jack with a metal bar and contacts the electrically live parts in the outlet, safety gate mechanisms are also provided. Taking a 15 A ground fault interrupter (a GFCI or GFI with 15 Ampere style sockets) as an example, as shown in FIGS. 8 and 9, the upper cover 5 is also provided, in the inner side, with safety gate mechanisms and a bottom cover plate 33. The bottom cover plate 33 covers the safety gate mechanisms in the inner side of the upper cover 5. The safety gate mechanisms include an upper slide plate 7, a lower slide plate 8, and their resetting mechanisms 11. Upper slide plate 7, lower slide plate 8 and their resetting mechanisms 11 are provided between the back face of upper cover 5 and the electrode, as shown in FIG. 9.

Figure 10:
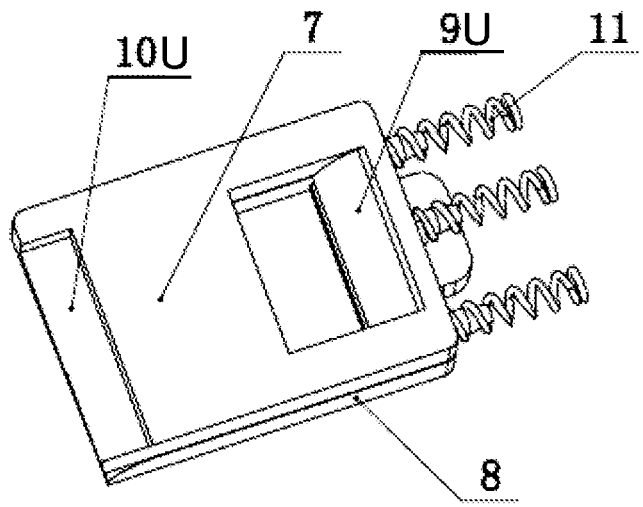
FIG. 10 is a view of a first configuration of safety gate mechanism for use with a 15 A socket jack.
Figure 11:
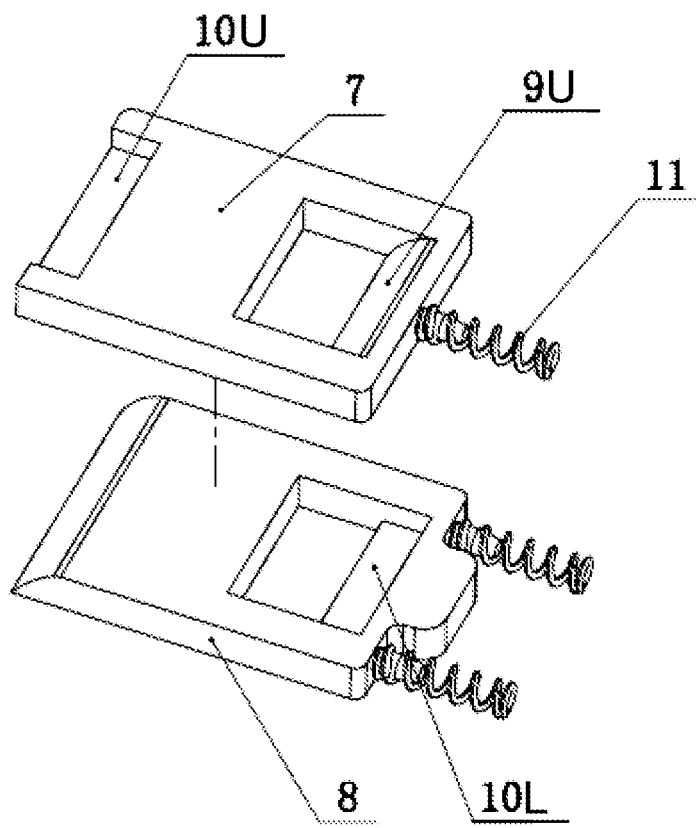
FIG. 11 is a second view of a first configuration of safety gate mechanism for use with a 15 A socket jack.
Figure 12:
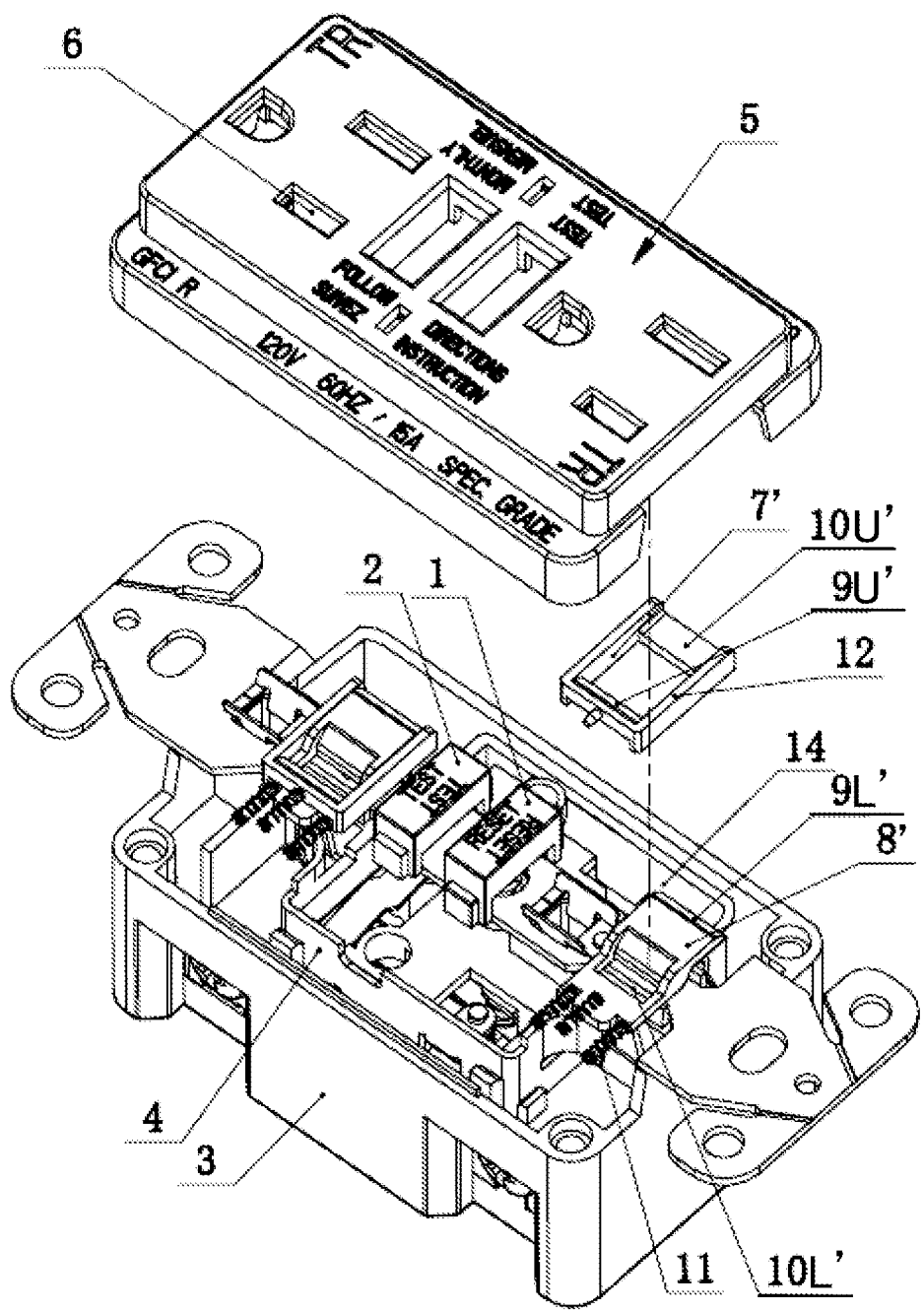
FIG. 12 is a view of an exemplary 15 A GFCI configured with 15 A socket jacks also having a second configuration of safety gate mechanisms.
Figure 13:
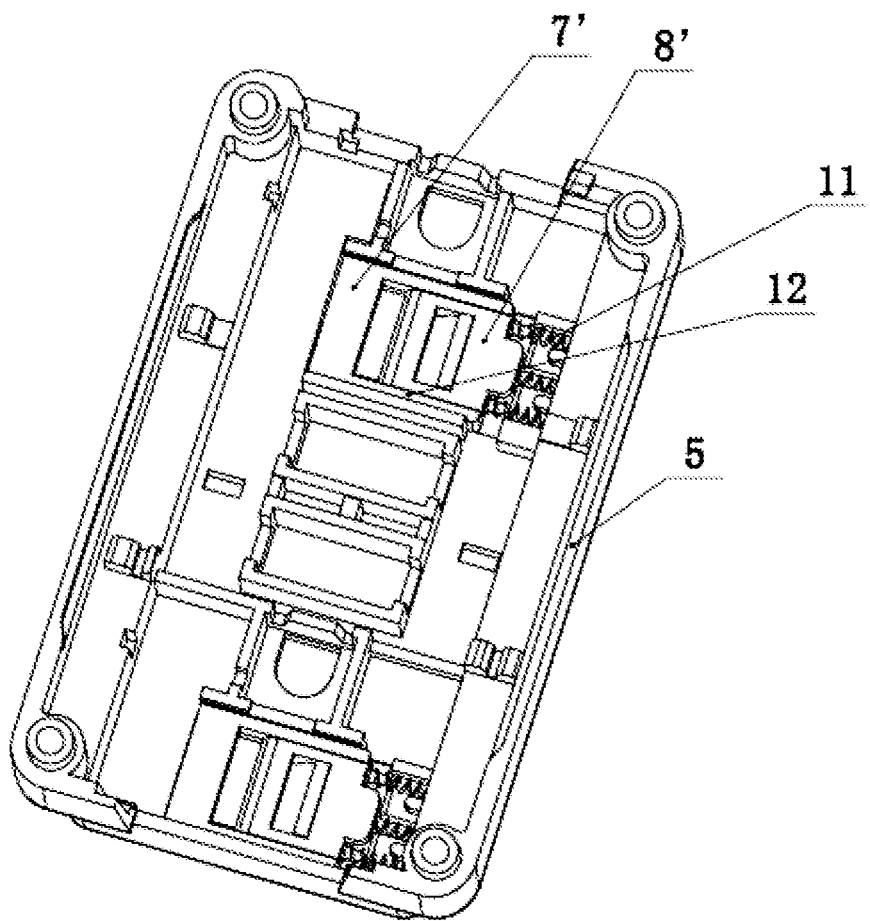
FIG. 13 is a view of a 15 A GFCI with a bottom cover plate removed and with the second configuration of safety gate mechanisms installed.

The shape and size of upper slide plate 7 and lower slide plate 8 shall satisfy the internal space, as shown in FIGS. 10 and 11. In this example, both upper slide plate 7 and lower slide plate 8 are rectangular flat plate components. Upper slide plate 7 and lower slide plate 8 are both provided with space for plug pins of a load plug to pass through. The space can be a window provided on the slide plate or a notch at the edge of the slide plate or otherwise the space outside the edge of the slide plate. The clearance of the space corresponds to the clearance of the plug pin.

In the example depicted in FIGS. 10 and 11, first windows are provided on a short side of upper slide plate 7 and lower slide plate 8 respectively as space for a plug pin to pass through. The other space for the plug pin to pass through is the space outside the edge of the slide plates. In this way, the size of upper slide plate 7 and lower slide plate 8 can be made relatively small. The first windows are close to a short side of upper slide plate 7 and lower slide plate 8. In the same side as the said windows (i.e. the side close to the short side) in the upper slide plate 7 and lower slide plate 8, an upper slant 9U and a lower recessed platform 10L are provided, respectively. On the other short side of upper slide plate 7 and lower slide plate 8, a lower slant 9L and an upper recessed platform 10U are provided, respectively. So, each of upper slide plate 7 and lower slide plate 8 has a slant and a recessed platform. The lengths of upper and lower slant 9U and 9L and upper and lower platform 10U and 10L correspond in size to the size of the socket jacks 6 and are no less than the length of a long slot hole of a 15 A socket jack; the widths are no less than the width of the long slot hole of a 15 A socket jack in order to ensure complete coverage of the socket jacks.

Upper slide plate 7 and lower slide plate 8 have their respective slants 9U and 9L consistent in direction, and can slide to overlay each other. The upper slant 9U of the upper slide plate 7 overlays the lower platform 10L of the lower slide plate 8, and the lower slant 9L of the lower slide plate 8 overlaps with the upper platform 10U of the upper slide plate 7. Either of the upper slide plate 7 and the lower slide plate 8 can be placed at the upper position to act as an upper slide plate.

The upper and lower slants 9U and 9L shall have such inclination that, when a slide plate slides due to interaction with one plug pin of the plug, the sliding displacement before the other plug pin can contact with the upper or lower platform 10U or 10L of the remaining socket should be no less than the thickness of the plug pin. For example, in the configuration of FIGS. 8 and 11, as a first plug pin enters a first socket jack and slides along upper slant 9U, upper platform 10U slides away from the opposite second socket jack to allow a second plug pin to be inserted successfully for interaction with lower slant 9L. As the second plug pin slides along lower slant 9L, the lower platform 10L slides away from the first socket jack to allow the first plug pin to pass to the power supply components. Therefore, the horizontal displacement induced on a slide plate as a plug pin slides from the highest point of an upper slant to a position on a corresponding lower platform is no less than the thickness of a plug pin, preferably no less than the width of the long slot hole. As an example, and referring to FIGS. 9-11, as a plug pin slides along upper slant 9U to contact lower platform 10L, upper slide plate 7 horizontally displaces only the thickness of the plug pin.

Meanwhile, the distance from the inner edge of a platform of a slide plate to the innermost edge of a slant on that platform is no more than the distance between two plug pins. As an example, and as shown in FIGS. 9-11, the distance from the innermost edge of upper platform 10U to the edge of the lowest position on the upper slant 9U is no more than the distance from the inner edge of a plug pin to the inner edge of the opposed parallel plug pin.

Upper slide plate 7 and lower slide plate 8 can be mounted movably to the back of the corresponding pair of socket jacks 6 on the enclosure. The sliding direction is perpendicular to the length of the long slot hole. The direction of the resetting elastic force of the resetting mechanisms 11 is contrary to the direction of the sliding action between the upper and lower slants 9U and 9L and the plug pins. Upper slant 9U and upper platform 10U should be aligned with the long slot holes of the socket jacks 6 and they should cover the openings of the socket jacks 6. Lower slant 9L and lower platform 10L should be vertically aligned with the long slot holes of the socket jacks 6 to vertically overlap the openings of the socket jacks.

Figure 3:
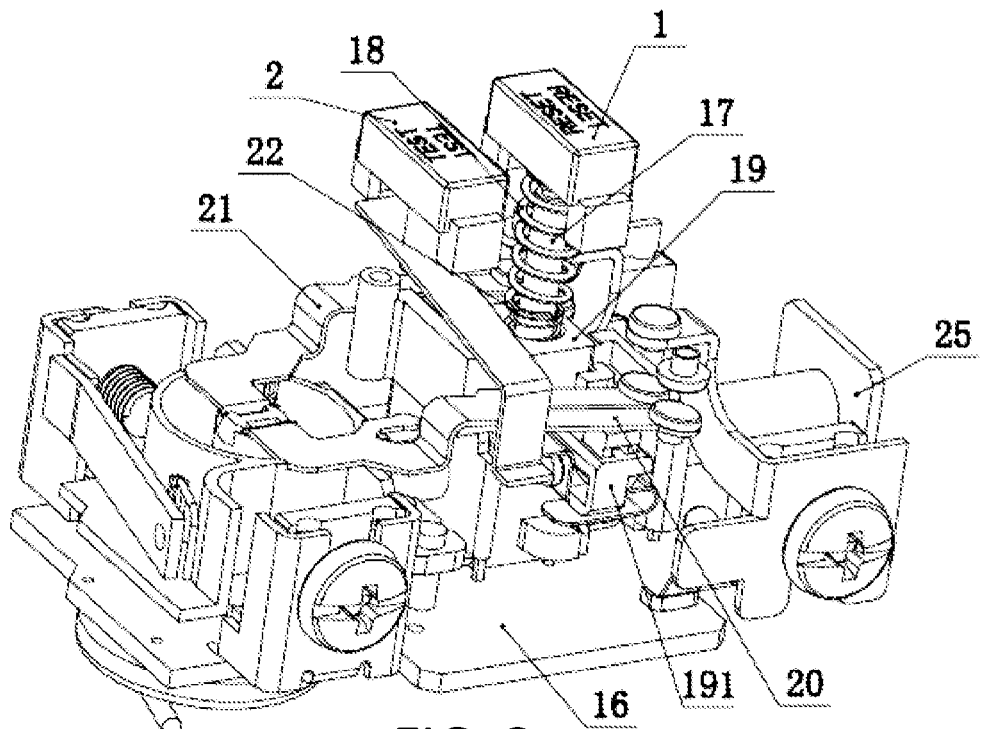
FIG. 3 is a first view of an example of a tripping mechanism.
Figure 4:
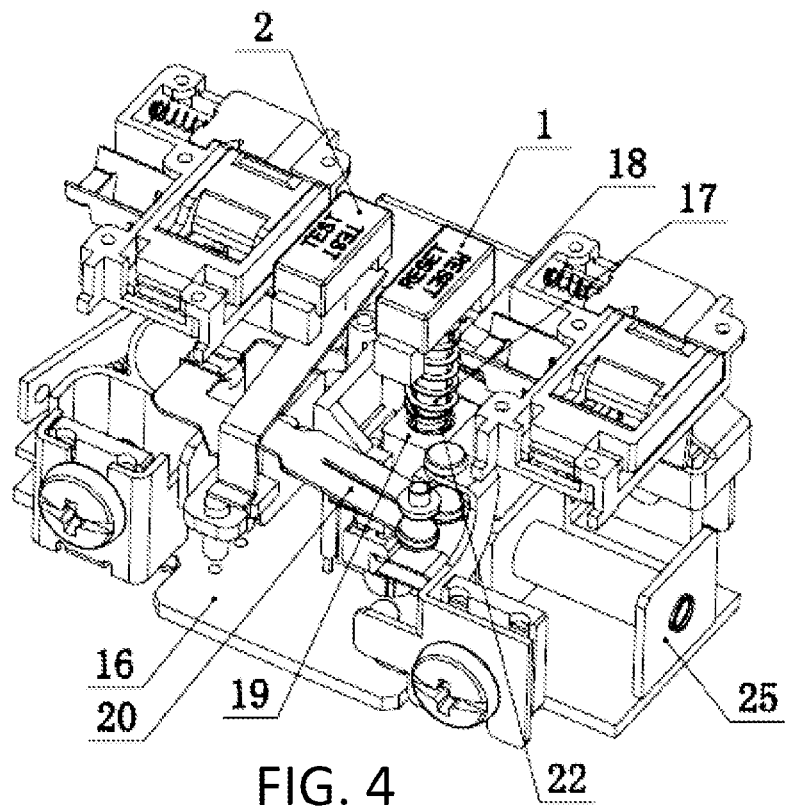
FIG. 4 is second view of an example of a tripping mechanism.

As shown in FIGS. 2-4, the resetting mechanisms can be composed of compression springs 11 provided in the corresponding sides of upper slide plate 7 and lower slide plate 8. First ends of the compression springs rest against the end faces of upper slide plate 7 and lower slide plate 8, and the other ends rest against the inner wall of upper cover 5.

Figure 14:
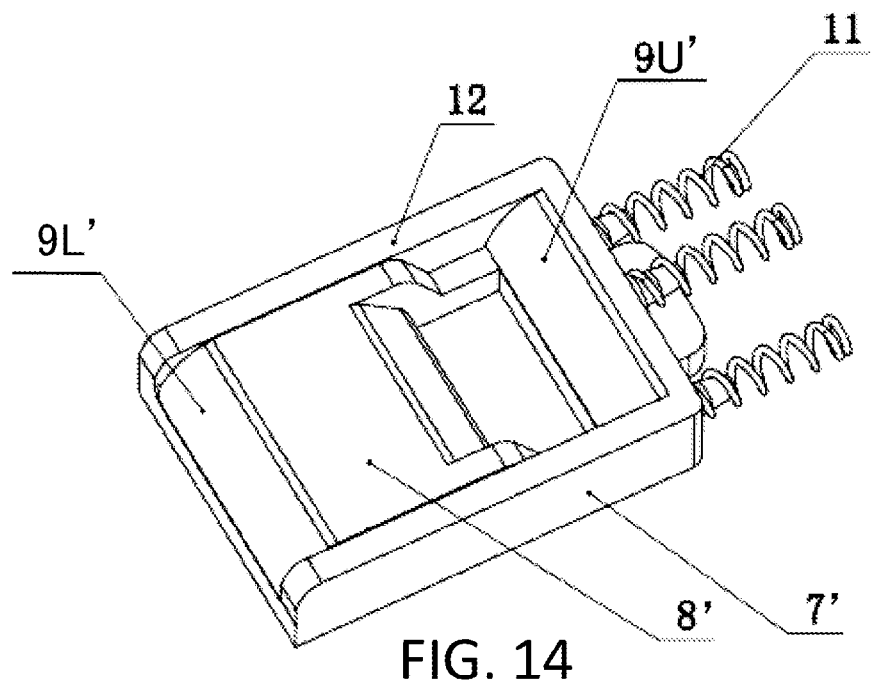
FIG. 14 is a view of a second configuration of safety gate mechanism for use with a 15 A socket jack.
Figure 15:
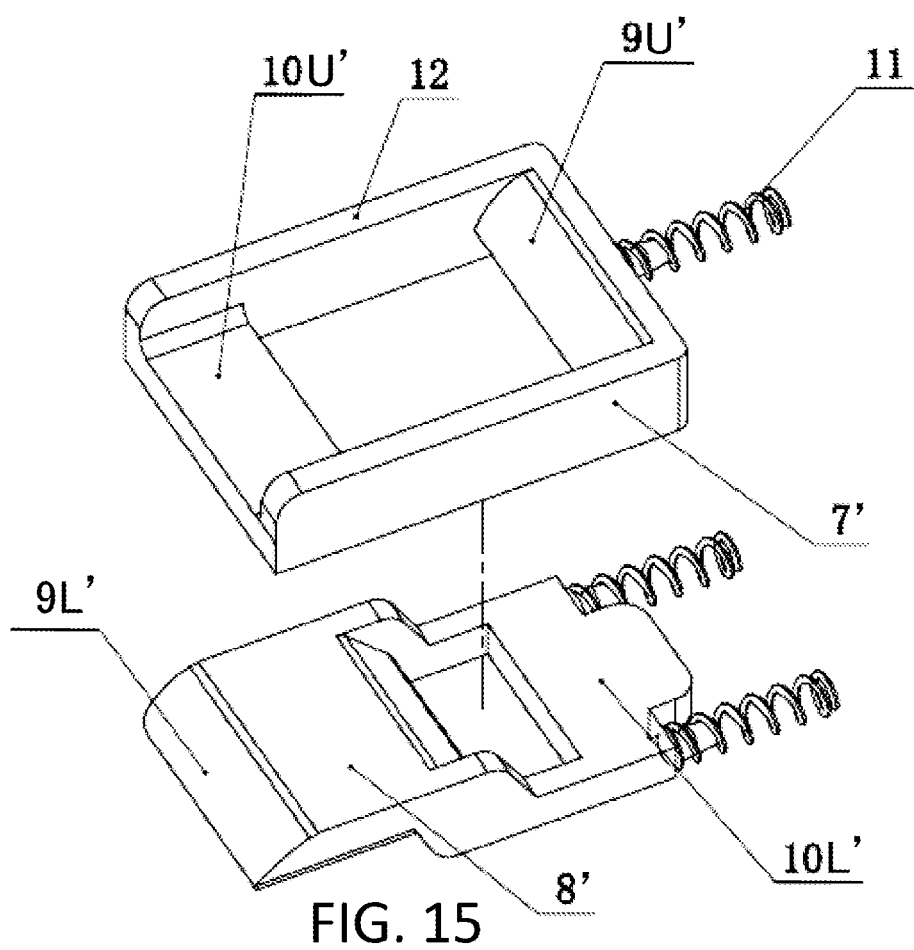
FIG. 15 is a second view of a second configuration of safety gate mechanism for use with a 15 A socket jack.

Besides what is shown in the above implementation example, FIGS. 14 and 15 show safety gate mechanisms where upper slide plate 7' is a flat plate framework component and lower slide plate 8' is a Z shape. The window on upper slide plate 7' makes a space for a plug pin to pass through. The edge of the window close to a first short side is set as an upper slant 9U' structure, and the surface of the opposite end is relatively low and makes an upper platform 10U'.

A horizontal displacement is induced as a plug pin slides from the highest point of upper slant 9U' to a position on the upper slant 9U' that is at equal height on the upper platform 10U'. The displacement is no less than the thickness of a plug pin. One end of the lower slide plate 8' penetrates the center window of upper slide plate 7' and overlays movably on the upper platform 10U'. The edge of the lower slide plate 8' at this end is set as a lower slant 9L'. Ribs 12 shall preferably be provided in the two sides of the upper platform 10U' of upper slide plate 7' for guiding purposes. The horizontal displacement induced as a plug pin slides from the highest point to the lowest point of the lower slant 9L' is no less than the thickness of the plug pin.

The distance from the edge of the upper platform 10U' to the position on the upper slant 9U' that is at an equal height to upper platform 10U' is no more than the distance between two parallel plug pins. The horizontal distance from the edge of the lower platform 10L' to the lower edge of the lower slant 9L' is no more than the distance between two plug pins so that the plug can be inserted smoothly.

Using the safety gate of FIGS. 14 and 15 as an example, the safety outlets operate as follows: When a load plug is not inserted in the outlet, under the action of their resetting mechanisms, upper slide plate 7' and lower slide plate 8' are configured so that upper and lower slants 9U' and 9L' and upper and lower platforms 10U' and 10L' align with and close the socket jacks 6. When any socket jack is poked by a foreign object, it firstly contacts with a slant or platform, such as upper slant 9U' then lower platform 10L'. Without proper action against the slant structure of upper slant 9U' or lower slant 9L', the slide plate will not move. So the slide plates can prevent a foreign object from further entering or contacting with the electrode and thereby realize the protection function.

In addition, when, for example, upper slant 9U' is below a socket jack and a foreign object can act on the slant structure of upper slant 9U', the slide plate will be pushed to one side. However, because the lower platform 10L' of the other slide plate is below the upper slant 9U', the lower platform 10L' can still prevent the foreign object from further entering the outlet or contacting with the electrode, and the outlet realizes the protection function. But, when pins of a plug are inserted in, the plug pins act on each of the corresponding upper and lower slants 9U' and 9L' in the socket hole, which allows each slide plate, upper and lower slide plates 7' and 8', to slide to one side. Meanwhile, the upper and lower platforms 10U' and 10L' below the socket jacks slide away from the socket jacks. In this way, the plug can be inserted smoothly and can be used normally.

Figure 16:
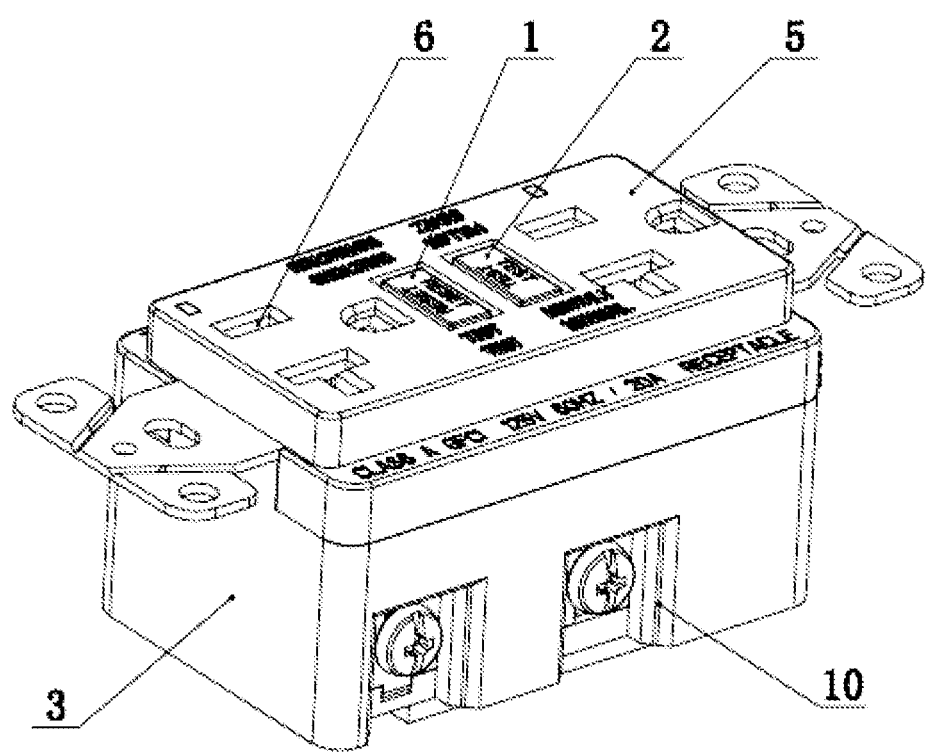
FIG. 16 is an example of a 20 A GFCI configured with 20 A socket jacks.
Figure 17:
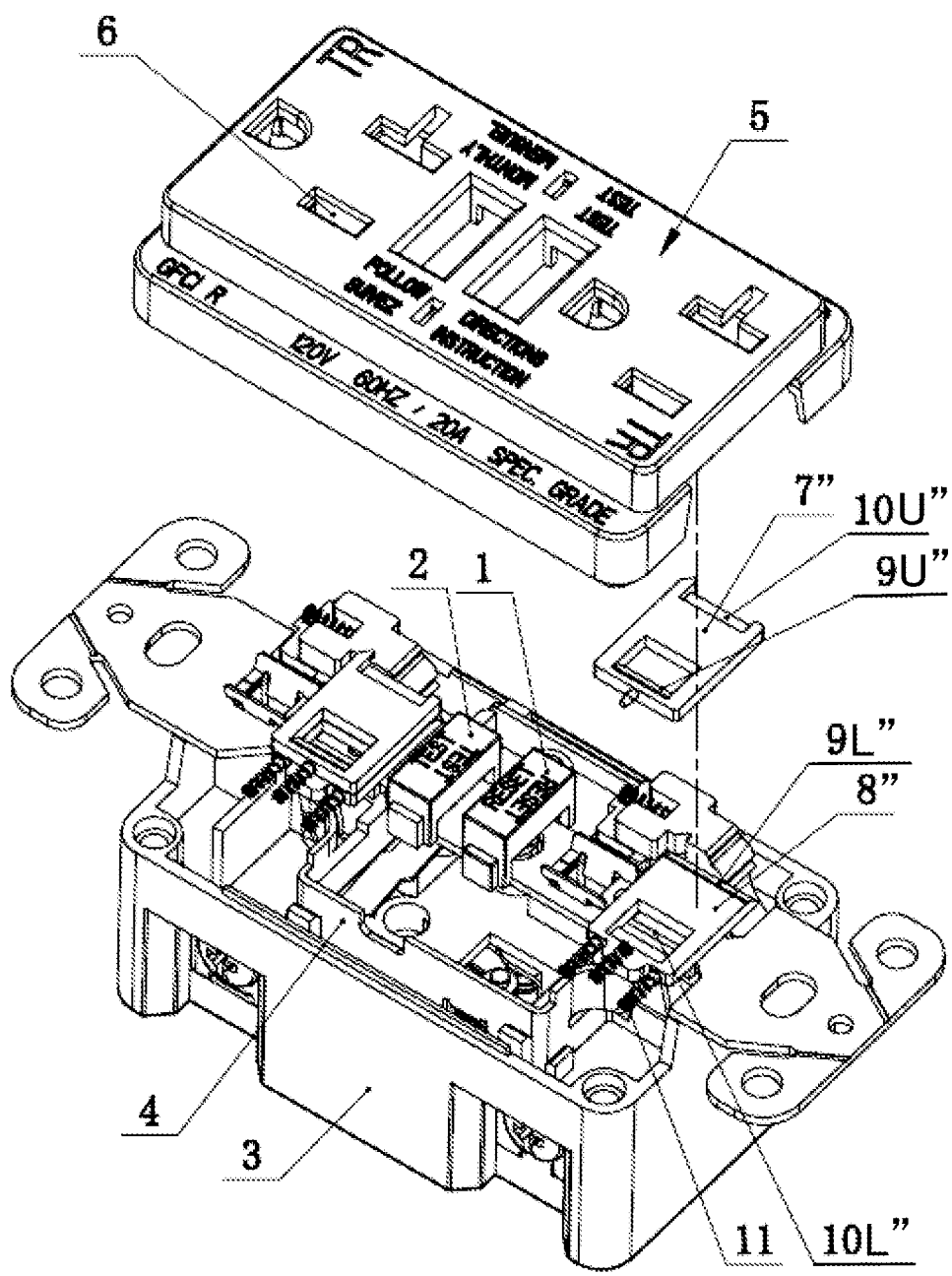
FIG. 17 is another view of an exemplary 20 A GFCI configured with 20 A socket jacks also having a third configuration of safety gate mechanisms.
Figure 18:
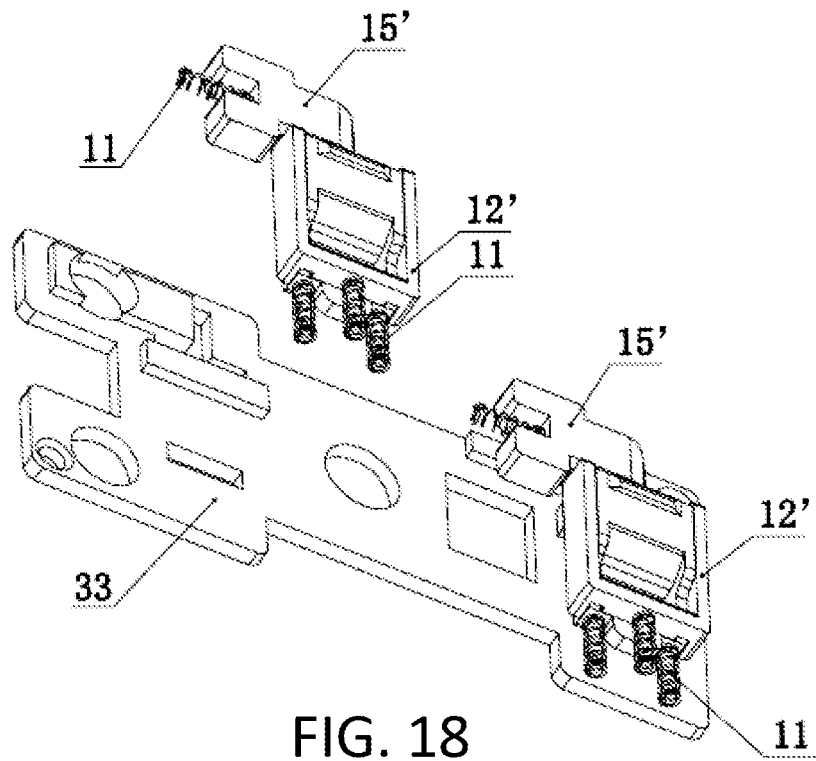
FIG. 18 is a view of a portion of a fourth configuration of safety gate mechanisms for use with 20 A socket jacks.
Figure 19:
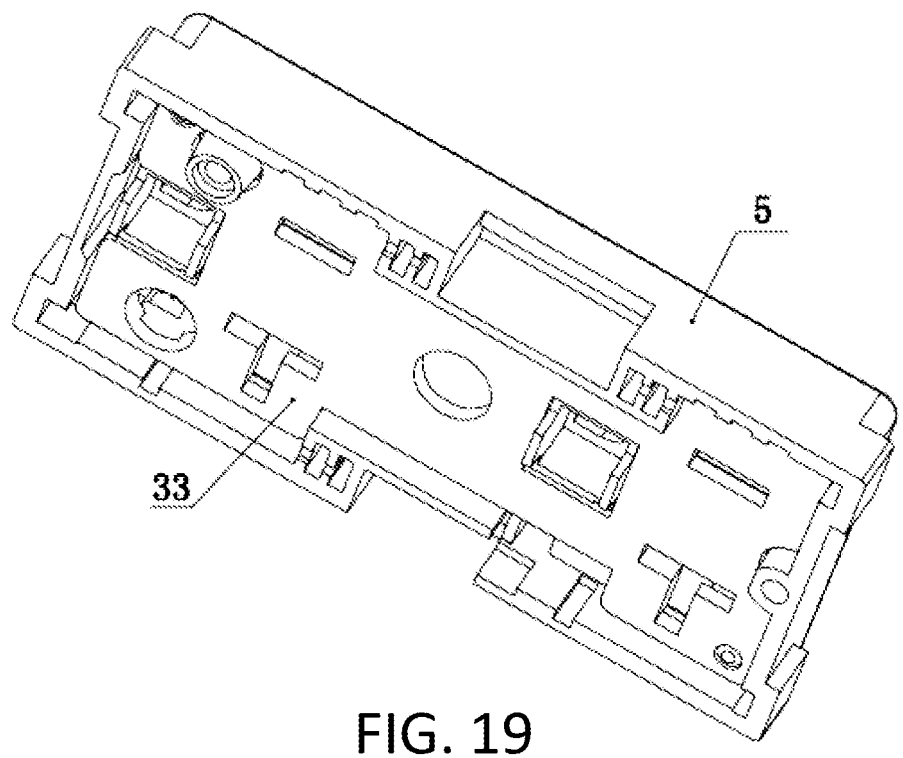
FIG. 19 is a view of a 20 A GFCI with a bottom cover plate removed and with the portion of the fourth configuration of safety gate mechanisms installed.

For a GFI with a higher working current, and due to the different shaped socket jacks, the structures of the safety gate mechanisms for higher working currents are slightly different than for the parallel 15 Amp examples above. For instance, a GFI with a rated current of 20 Amps has additional features. As shown in FIG. 16, on the upper cover 5, each group of socket jacks 6 include a grounding wire hole, a T-shaped hole, and a long slot hole parallel with the cross bar of the T-shaped hole. These holes are distributed in a generally triangle configuration.

Figure 25:
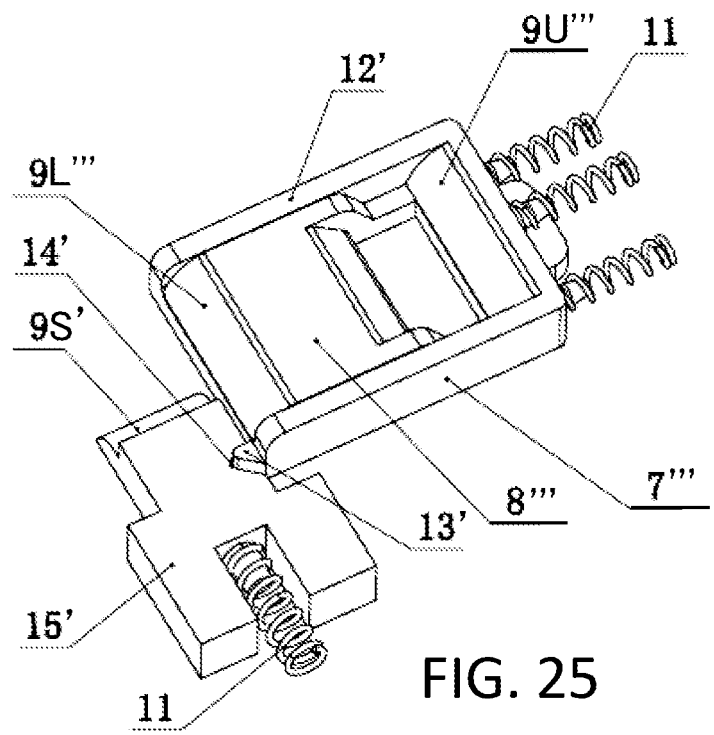
FIG. 25 is a view of a fourth configuration of safety gate mechanism for use with a 20 A socket jack.
Figure 26:
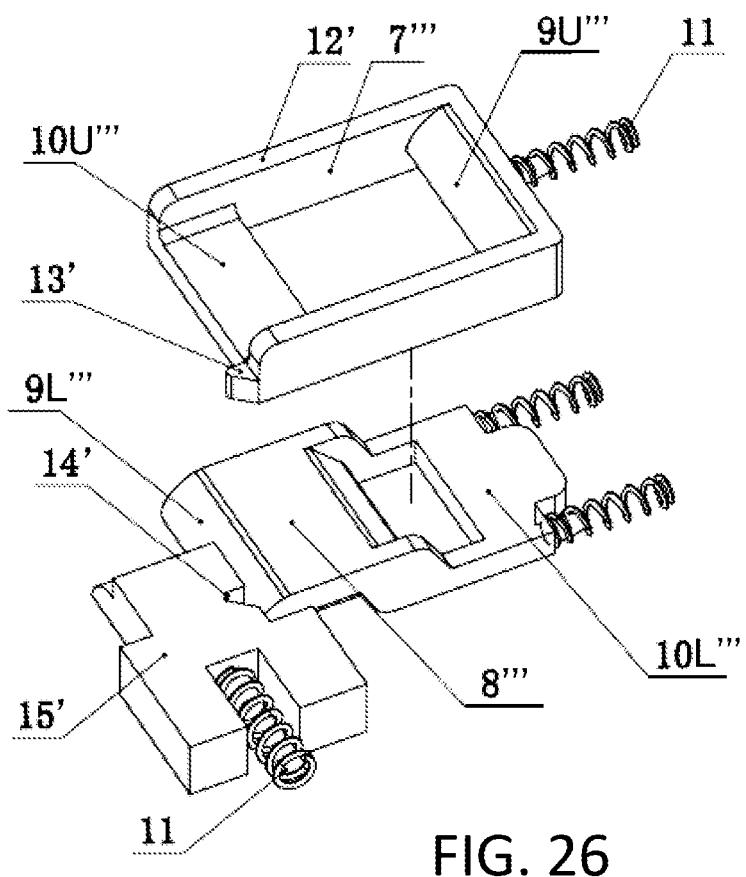
FIG. 26 is a second view of a fourth configuration of safety gate mechanism for use with a 20 A socket jack.

As shown in FIGS. 17 and 20-22, the upper cover 5 is provided with safety gate mechanisms. Each safety gate mechanism includes an upper slide plate 7'', a lower slide plate 8'', a side slide plate 15, and their resetting mechanisms 11. As shown in FIGS. 25 and 26, the structure of upper slide plate 7' and lower slide plate 8' can be similar to that in the second implementation example.

Figure 21:
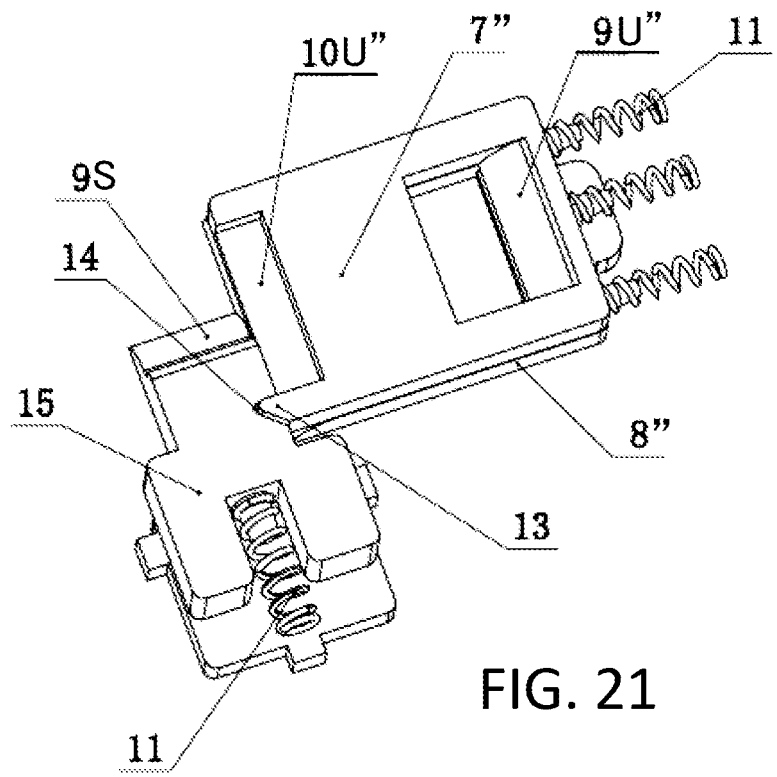
FIG. 21 is a first view of a third configuration of safety gate mechanism for use with a 20 A socket jack.
Figure 22:
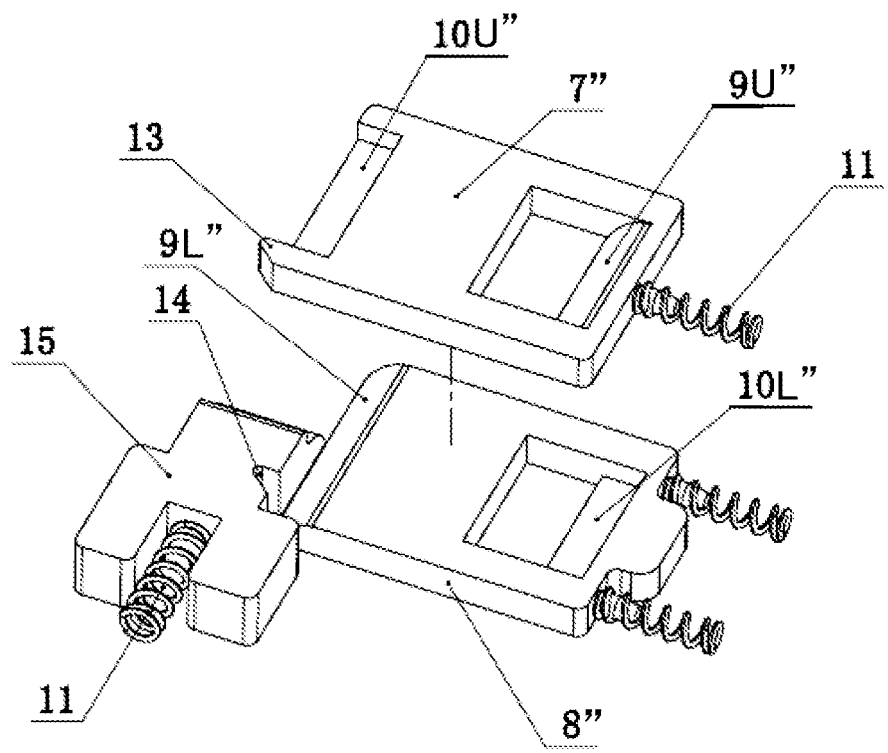
FIG. 22 is a second view of a third configuration of safety gate mechanism for use with a 20 A socket jack.
Figure 23:
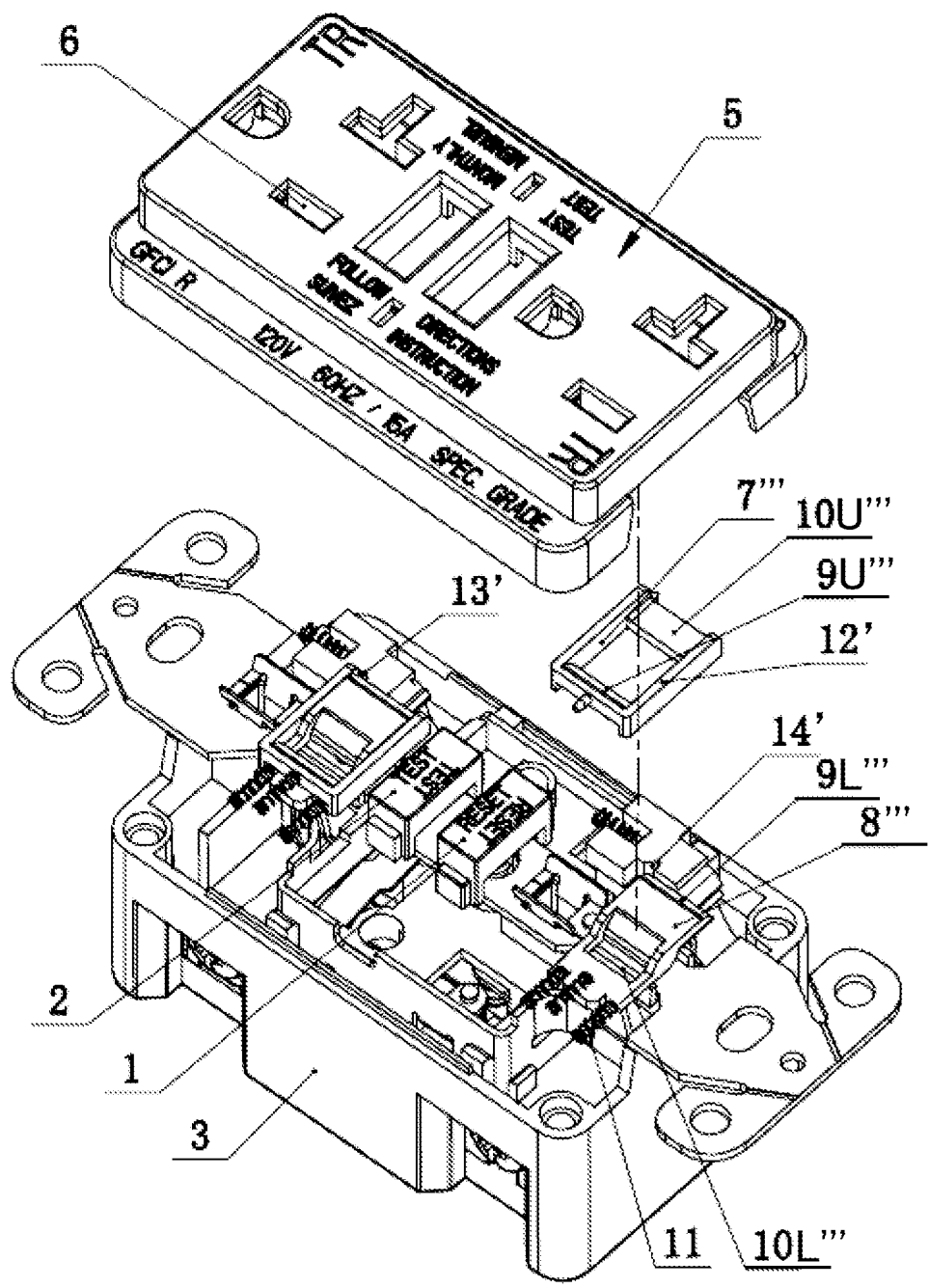
FIG. 23 is a view of an exemplary 20 A GFCI configured with 20 A socket jacks also having a fourth configuration of safety gate mechanisms.

As shown in FIGS. 21 and 22, the slant angles of the upper and lower slants 9U'' and 9L'' are consistent in direction and can allow the slide plates 7'' and 8'' to overlay together movably. The upper slant 9U'' is provided on the side of a window within upper slide plate 7'', while the lower slant 9L'' is provided at an edge of the short side of upper slide plate 7''. The slant angles are so oriented that both upper slide plate 7'' and lower slide plate 8'' slide away from side slide plate 15. The upper slant 9U'' overlays the lower platform 10L'', and the lower slant 9L'' vertically overlaps the upper platform 10U''. The upper slant 9U'' corresponds to the long slot hole of the socket jack. On the other end of upper slide plate 7'', near upper platform 10U'', a projecting stopping block 13 is provided. The slant angles shall have such inclination that, when plug pins act against the slants, the slide plates slide due to the interaction with the plug pins. One slant can slide by action of a plug pin and have a sliding displacement before a second plug pin can contact an opposed platform. The sliding displacement should be no less than the thickness of the plug pin.

Figure 20:
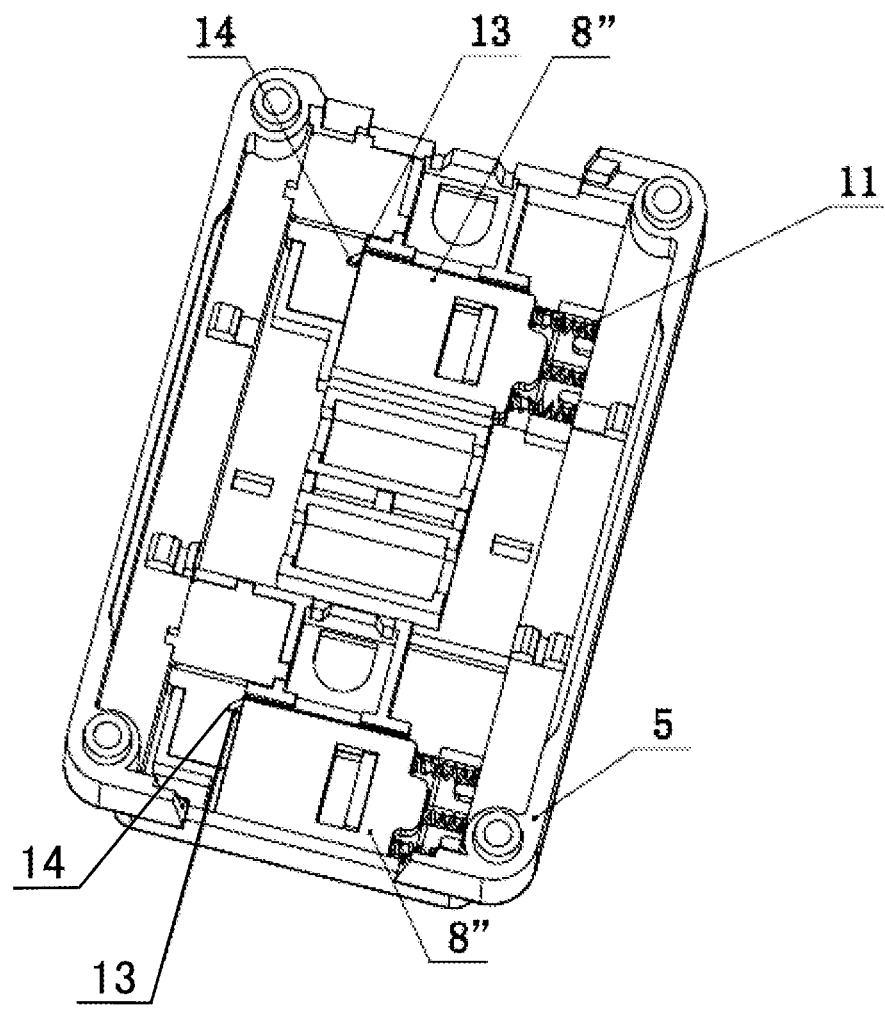
FIG. 20 is a view of a 20 A GFCI with a bottom cover plate removed and with a third configuration of safety gate mechanisms installed.

As shown in FIG. 20, upper slide plate 7'' and lower slide plate 8'' are mounted to the back of the corresponding socket jack 6 on the enclosure. The direction of the resetting elastic force of the resetting mechanisms 11 is contrary to the direction of the sliding action induced between the upper and lower slants 9U'' and 9L'' and the plug pins. The upper and lower slants and platforms 9U'', 9L'', 10U'' and 10L'' should be vertically aligned with the cross bar of the T-shaped hole and the long slot hole of the socket jack 6. The sliding trace, or footprint, of stopping block 13 shall preferably not pass below the cross bar of the T-shaped hole to facilitate minimization of the sizes of upper slide plate 7'' and lower slide plate 8''.

As shown in FIGS. 21 and 22, side slide plate 15 is generally rectangular too. The long side is mounted to upper slide plate 7'' at the end with stopping block 13. The sliding direction is perpendicular to the moving direction of upper slide plate 7'' and lower slide plate 8''. Side slide plate 15, at the side closest to stopping block 13, is provided with a slide notch, which can be a pit or the illustrated exemplary groove 14. As shown, the groove 14 is perpendicular to the sliding direction. Groove 14 cooperates with stopping block 13 to form a stopping mechanism for side slide plate 15. Side slide plate 15 has one end for vertically covering the vertical bar of the T-shaped hole, and is provided with side slant 9S to correspond to the vertical part of the T-shaped hole. The slant configuration of upper slant 9U'' is vertically higher than the slant configuration of side slant 9S on the side slide plate 15 to ensure that, when the plug pin contacts with the side slant 9S, the upper slant 9U'' can slide for sufficient displacement under the action of the plug pin to allow the stopping block 13 to be withdrawn out of the groove 14 or pit.

Figure 24:
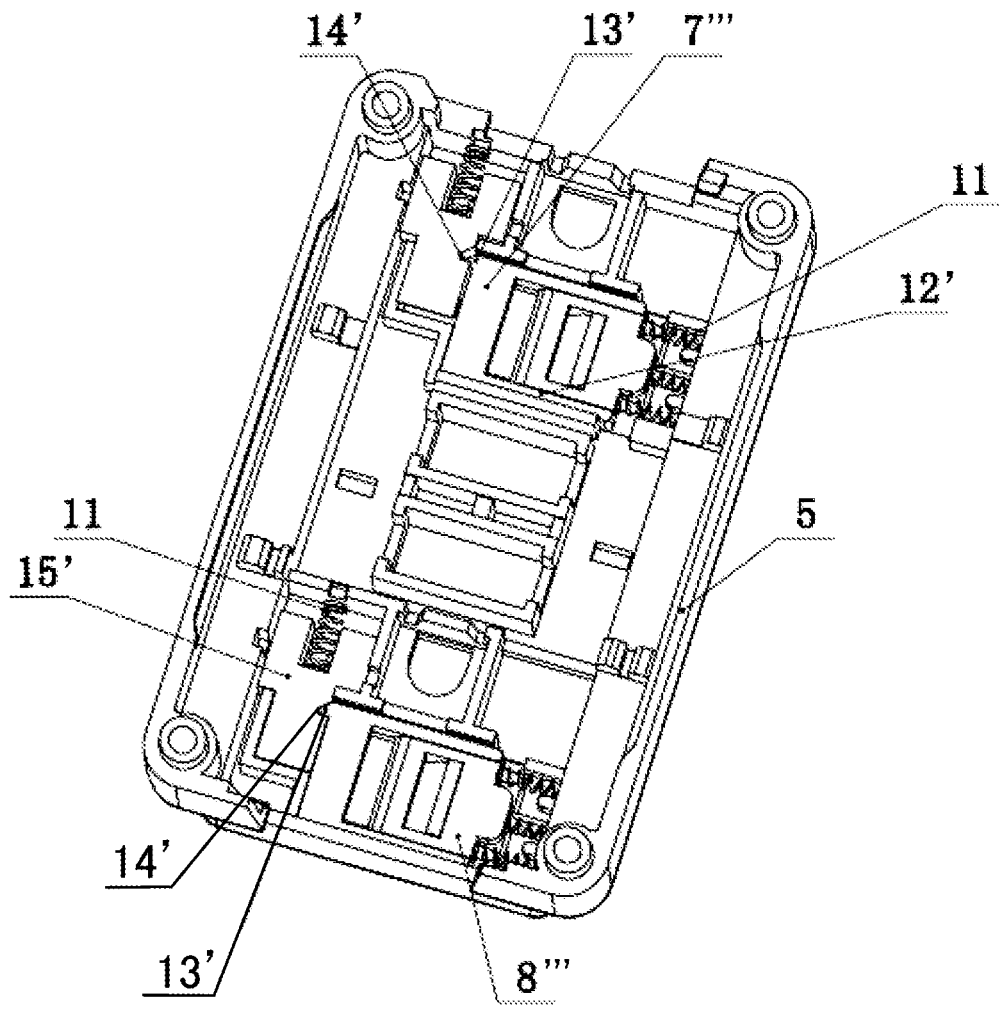
FIG. 24 is a view of a 20 A GFCI with a bottom cover plate removed and with the fourth configuration of safety gate mechanisms installed.

For the plug-type GFCI with a rated current of 20 A, as shown in FIGS. 24-26, the structure of upper slide plate 7''' and lower slide plate 8''' in the safety gate mechanism is similar to that in the second implementation example. As shown in FIGS. 25 and 26, upper slide plate 7''' is a flat plate frame component. The lower slide plate 8''' is a Z shape. One end of lower slide plate, including the lower slant 9L''', penetrates the center of the upper slide plate 7''' and overlays on the upper platform 10U'''. The two sides of upper slide plate 7''' shall preferably be slightly higher to form a guiding structure.

A stopping block 13' is provided at one end of the upper platform 10U'''. As a plug pin interacts with the upper slant 9U''', the horizontal displacement of upper slide plate 7''' as the plug pin slides from the highest point of the upper slant 9U''' to the position on upper slant 9U''' at equal height to the upper platform 10U''' is no less than the thickness of the plug pin. Likewise, for a second plug pin interacting with lower slant 9L''', the horizontal displacement of lower slide plate 8''' as the second plug pin slides from the highest point to the lowest point of the lower slant 9L''' is no less than the thickness of the second plug pin. The distance from the innermost edge of the upper platform 10U''' to the position on the upper slant 9U''' at equal height as the upper platform 10U''' is no more than the distance between the two parallel portions of a plug pin. The horizontal distance from the edge of the lower platform 10UL''' to the lower edge of the lower slant 9L''' is no more than the distance between two parallel portions of a plug pin.

As shown in FIG. 26, a side slide plate 15' is mounted to upper slide plate 7''' at the end with projecting stopping block 13'. The sliding direction of side slide plate 15' is perpendicular to the moving direction of upper slide plate 7' and lower slide plate 8'''. The side slide plate 15', at the side closest to stopping block 13', is provided with a slide notch. The slide notch can be a pit or, as shown, a groove 14', perpendicular to the sliding direction. Groove 14' or pit cooperates with stopping block 13' to form a stopping mechanism for side slide plate 15'. Side slide plate 15' has one end vertically close to the vertical bar of the T-shaped hole, and is provided with side slant 9S' to correspond to the vertical part of the T-shaped hole. The upper slant 9U' is higher than the side slant 9S to ensure that, when a plug pin contacts with the side slant 9S on the side slide plate 15', the upper slant 9U''' can slide for sufficient displacement under the action of a plug pin to allow the stopping block 13' to be withdrawn out of the groove 14' or pit.

The working principle of the safety gate mechanism for a 20 A safety outlet is as follows: The protection principle for the cross bar and parallel long slot hole of the T-shaped hole in socket jack 6 is the same as the principle of the safety gate mechanism in Implementation Examples 1 and 2. When a foreign object is inserted into a socket jack, the foreign object cannot pass through both upper and lower slide plates. For example, when a foreign object is inserted into the vertical bar of the T-shaped hole, because the upper slant 9U'' or 9U''' does not retreat due to the insertion force, stopping block 13 or 13' is still blocked in the groove 14 or 14' of side slide plate 15 or 15'. Therefore, side slide plate 15 or 15' can not move to expose the socket jacks, and the protection purpose is achieved.

When a 15 A plug is inserted into the 20 A outlet, the plug pin corresponding to the upper slant 9U'' or 9U''' acts to allow the upper slide plate 7'' or 7''' to slide to one side. Meanwhile, the corresponding upper or lower platform 10L'' or 10L''' below the other socket jack slides away from the socket jack. The lower slant 9L'' or 9L''' is then acted upon by a plug pin, which also causes the lower slants 10L' or 10L''' to move away from their socket jacks. In this way, the plug can be inserted in smoothly and can be used normally.

When a 20 A plug is inserted, the plug pin on the plug corresponding to the long slot hole firstly contacts with the upper slant 9U'' or 9U''', forcing the upper slide plate 7'' or 7''' to retreat. In the meantime, stopping block 13 or 13' withdraws from the groove 14 or 14'. The plug is further inserted in. When the plug pin on the plug corresponding to the vertical bar of the T-shaped hole contacts with the side slant 9S or 9S', side slide plate 15 or 15' retreats so that the plug is further inserted to the power supply position. The cross bar portion of the plug pin acts on lower slant 9L" or 9L'" to move the remaining lower slide plate 8" or 8"'.

The safety gate mechanisms also apply to other types of outlets that are not the depicted 15 A or 20 A style, including wall outlets. As long as the live socket jacks are composed of parallel long slot holes, corresponding safety gate mechanisms may be provided behind the socket jacks.

In the preceding specification, various preferred embodiments have been described with reference to the accompanying drawings. It will, however, be evident that various other modifications and changes may be made thereto, and additional embodiments may be implemented, without departing from the broader scope of the invention as set forth in the claims that follow. The specification and drawings are accordingly to be regarded in an illustrative rather than restrictive sense.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

I claim:

1. A ground fault interrupter that trips at its end-of-life and emits an end-of-life warning, comprising:
    a live load power supply line;
    a neutral load power supply line;
    a power unit comprising a rectifier and a filter;
    a tripping coil and a fuse connected in series to the rectifier;
    a leakage signal detection circuit comprising:
        a test toroidal coil;
        a neutral toroidal coil; and
        a leakage signal amplification circuit;
    a tripping silicon control having at least one igniter connection and at least one other connection, the igniter connection connected to the leakage signal amplification circuit and the at least one other connection connected in series to the power supply circuit of the tripping coil;
    a mechanical forcible tripping mechanism connected to the leakage signal detection circuit;
    a forcible tripping circuit for controlling the mechanical forcible tripping mechanism, the forcible tripping circuit comprising a forcible tripping coil connected in series with a forcible tripping silicon control, which is connected to the live load power supply line and the neutral load power supply line;
    a mechanical protection tripping mechanism;
    an interlock mechanism between the mechanical protection tripping mechanism and the mechanical forcible tripping mechanism; and
    a failure alarm circuit comprising a half-wave rectification filter circuit, a switch triode, and an optical display element,
    wherein:
    the power unit is configured to receive AC power from an AC power supply and to supply DC power through full wave rectification by the rectifier and filtration by the filter,
    the power unit supplies power to the leakage signal amplification circuit,
    the test toroidal coil and the neutral toroidal coil are connected to the leakage signal amplification circuit,
    the failure alarm circuit is connected to the DC output of the power unit, and
    the forcible tripping coil is connected in series to the live load power supply line and the neutral load line power supply line.

2. The ground fault interrupter of claim 1, wherein the interrupter also provides overcurrent protection and further comprises:
    a bimetal;
    a mechanical contact; and
    a current-limiting resistor,
    wherein the mechanical contact and the current-limiting resistor are connected in series and are then bridged over to the outer side of the test toroidal coil and the neutral toroidal coil, and
    wherein the mechanical contact is provided near the bimetal so that the bimetal, when deformed due to heat, is capable of making the mechanical contact close.

3. The ground fault interrupter of claim 1, wherein:
    the mechanical protection tripping mechanism comprises:
        a middle frame;
        a resetting bar having an upper end fixable to a resetting key and a lower end comprising an annular latch groove;
        a resetting spring sleeve on the resetting bar;
        a resetting spring with a first end resting against the resetting key and a second end resting against the middle frame;
        a tubular resetting bracket with bracket arms extending symmetrically from two sides, the resetting bracket further comprising:
            a through-hole; and
            a first notch perpendicular to a center axis of the resetting bracket;
        a reverse elastic supporting mechanism coaxial with the resetting bar and the resetting bracket, the reverse elastic supporting mechanism comprising an elastic force in a direction contrary to the direction of the resetting bar, thereby forming an elastic floating and resetting mechanism for the resetting bracket;
        an electromagnetic actuator on a side of the resetting bracket, the electromagnetic actuator comprising:
            a tripping coil bracket;
            the tripping coil;
            a tripping iron core comprising an annular groove on an end facing the resetting bracket; and
            an iron core spring; and
        a latch piece with a first end having a long circular hole, the first end configured to insert into the first notch of the resetting bracket, and a second end with a second notch, the second notch configured to mate with the annular groove to form a linkage with the tripping iron core,
    the mechanical forcible tripping mechanism is located on a side of the resetting bracket contrary to the electromagnetic actuator, and the mechanical forcible tripping mechanism further comprises:
        a forcible tripping iron core movably in a center of the forcible tripping coil, a main axis of the forcible tripping iron core perpendicular to a main axis of the latch piece;
        a forcible tripping iron core resetting spring; and
        a pulling piece with a slant, the pulling piece fixed to an upper end of the forcible tripping iron core, the resetting bar fits moveably into the center through-hole of the resetting bracket, a longitudinal axis of the electromagnetic actuator is perpendicular to a longitudinal axis of the elastic floating and resetting mechanism, the first end of the latch piece is configured to move back and forth in the first notch so as to selectively mis-align the long circular hole relative to the through-hole of the resetting bracket and relative to the annular latch groove of the resetting bar, thereby forming a bayonet switch, and the slant of the pulling piece is in front of the latch piece to form the interlock mechanism, the interlock mechanism configured to trip the mechanical protection tripping mechanism.

4. The ground fault interrupter of claim 2, wherein:

the mechanical protection tripping mechanism comprises:
  a middle frame;
  a resetting bar having an upper end fixable to a resetting key and a lower end comprising an annular latch groove;
  a resetting spring sleeve on the resetting bar;
  a resetting spring with a first end resting against the resetting key and a second end resting against the middle frame;
  a tubular resetting bracket with bracket arms extending symmetrically from two sides, the resetting bracket further comprising:
    a through-hole; and
    a first notch perpendicular to a center axis of the resetting bracket;
  a reverse elastic supporting mechanism coaxial with the resetting bar and the resetting bracket, the reverse elastic supporting mechanism comprising an elastic force in a direction contrary to the direction of the resetting bar, thereby forming an elastic floating and resetting mechanism for the resetting bracket;
  an electromagnetic actuator on a side of the resetting bracket, the electromagnetic actuator comprising:
    a tripping coil bracket;
    the tripping coil;
    a tripping iron core comprising an annular groove on an end facing the resetting bracket; and
    an iron core spring; and
  a latch piece with a first end having a long circular hole, the first end configured to insert into the first notch of the resetting bracket, and a second end with a second notch, the second notch configured to mate with the annular groove to form a linkage with the tripping iron core, the mechanical forcible tripping mechanism is located on a side of the resetting bracket contrary to the electromagnetic actuator, and the mechanical forcible tripping mechanism further comprises:
  a forcible tripping iron core movably in a center of the forcible tripping coil, a main axis of the forcible tripping iron core perpendicular to a main axis of the latch piece;
  a forcible tripping iron core resetting spring; and
  a pulling piece with a slant, the pulling piece fixed to an upper end of the forcible tripping iron core, the resetting bar fits moveably into the center through-hole of the resetting bracket, a longitudinal axis of the electromagnetic actuator is perpendicular to a longitudinal axis of the elastic floating and resetting mechanism, the first end of the latch piece is configured to move back and forth in the first notch so as to selectively mis-align the long circular hole relative to the through-hole of the resetting bracket and relative to the annular latch groove of the resetting bar, thereby forming a bayonet switch, and the slant of the pulling piece is in front of the latch piece to form the interlock mechanism, the interlock mechanism configured to trip the mechanical protection tripping mechanism.

5. The ground fault interrupter of claim 1, wherein the interlock mechanism trips the mechanical protection tripping mechanism when the mechanical forcible tripping mechanism trips.

6. The ground fault interrupter of claim 1, wherein:
  the forcible tripping silicon control further comprises an igniter,
  the half-wave rectification filter circuit comprises a diode, a resistor, and a capacitor,
  the switch triode of the failure alarm circuit further comprises:
    a base pole, a collector and an emitter, the switch triode connected between power supplies of the rectifier and the half-wave rectification filter;
  the failure alarm circuit further comprises:
    an optical coupling element comprising a series arm and an output; and
    a light emitting diode connected in parallel between the collector and the emitter of the switch triode and the series arm of the optical coupling element,
  the base pole of the switch triode is connected with the DC power supply of the leakage signal detection circuit through a current-limiting resistor, and
  the output of the optical coupling element is connected with the igniter of the forcible tripping silicon control.

7. The ground fault interrupter of claim 1, further comprising a pedestal and an upper cover with jacks.

8. The ground fault interrupter of claim 1, wherein the rectifier is a rectification bridge.

9. The ground fault interrupter of claim 1, wherein the leakage signal amplification circuit comprises a leakage signal amplification integrated circuit as its core.

10. The ground fault interrupter of claim 1, further comprising:
  an upper cover with at least one socket jack and at least one safety gate mechanism aligned with the socket jack on an inner side; and
  a bottom cover plate comprising through-holes for plug pins of a load plug, the bottom cover plate covering the at least one safety gate mechanism, wherein the safety gate mechanisms comprise:
  an upper slide plate comprising an upper slant and an upper platform;
  a lower slide plate comprising a lower slant and a lower slide platform;
  at least one upper resetting mechanism; and
  at least one lower resetting mechanism,
  wherein:
    the upper slide plate and the lower slide plate are configured to provide spaces for plug pins to pass through, and the spaces are sized to correspond to a size of each plug pin,
    the upper slant and the lower slant are consistent in direction,
    the upper slide plate and the lower slide plate are configured to slide relative to one another such that the upper slant is configured to slide from a position overlaying the lower platform and the lower slant is configured to slide from a position vertically overlapping the upper platform, the upper slant and the lower slant each have an angle of inclination, and the angles of inclination are configured such that when a plug pin interacts with the upper slant or the lower slant, the upper slant or the lower slant displaces a distance equal to a thickness of the plug pin, the upper resetting mechanism has an elastic force in a direction contrary to a displacement direction of the upper slide plate, and the lower resetting mechanism has an elastic force in a direction contrary to a displacement direction of the lower slide plate.

11. The ground fault interrupter of claim 10, wherein:

the upper slide plate is configured as a flat plate with a central opening, the lower slide plate is configured as a Z-shape, a first end of the lower slide plate penetrates the central opening such that the lower slant overlays the upper platform, the safety gate mechanism is configured such that, when a plug pin slides from an upper edge of the upper slant to a lower edge of the upper slant, the upper platform horizontally displaces a distance no less than the thickness of the plug pin, and such that when a plug pin slides from an upper edge of the lower slant to a lower edge of the lower slant, the lower platform horizontally displaces a distance no less than the thickness of the plug pin, the distance from an inner edge of the upper platform to a position on the upper slant that is at an equal height to the upper platform is no more than the distance between two load plug pins, and the distance from an inner edge of the lower platform to a lower edge of the lower slant is no more than the distance between two load plug pins.

12. The ground fault interrupter of claim 1, further comprising:

an upper cover with at least one socket jack and at least one safety gate mechanism aligned with the socket jack on an inner side, the socket jack comprising at least one T-shaped hole and at least one long slot hole parallel to a cross bar of the T-shaped hole; and a bottom cover plate comprising through-holes for plug pins of a load plug, the bottom cover plate covering the at least one safety gate mechanism, wherein the safety gate mechanisms comprise:

an upper slide plate comprising an upper slant and an upper platform;

a lower slide plate comprising a lower slant and a lower slide platform;

a side slide plate comprising a side slant and a slide notch;

a projection block configured to selectively abut the slide notch;

at least one upper resetting mechanism;

at least one lower resetting mechanism; and at least one side slide plate resetting mechanism, wherein:

the upper slide plate and the lower slide plate are configured to provide spaces for a long plug pin and a cross bar of a T-shaped plug pin to pass through, and the spaces are sized to correspond to the size of each of the long slot plug pin and the cross bar of the T-shaped plug pin, the side slide plate is configured to slide to accommodate the remainder of the T-shaped plug pin, the side slide plate and the projection block are adjacent one of the upper slide plate or the lower slide plate, the upper slant and the lower slant are consistent in direction, the upper slide plate and the lower slide plate are configured to slide relative to one another such that the upper slant is configured to slide from a position overlaying the lower platform and the lower slant is configured to slide from a position vertically overlapping the upper platform, the side slide plate slides in a direction perpendicular to the relative sliding direction of the upper slide plate and the lower slide plate, the upper slide plate and the lower slide plate are configured to slide away from the side slide plate, the upper slant and the lower slant each have an angle of inclination, and the angle of inclination is configured such that when a plug pin interacts with the upper slant or the lower slant, the upper slant or the lower slant displaces a distance equal to a thickness of the plug pin, the side slant is vertically higher than the upper slant and the lower slant, and, when a T-shaped plug pin and a long plug pin are inserted into the socket jacks, the side slant has an angle of inclination configured to interact with the remainder of the T-shaped plug pin such that the T-shaped plug displaces the side slant before the crossbar of the T-shaped plug or the long plug pin can interact with the upper slant or the lower slant, the upper slide plate is positioned relative to the side slide plate such that displacement of the upper slide plate brings the projection block out of abutment with the slide notch to allow the side slide plate to slide, the upper resetting mechanism has an elastic force in a direction contrary to a displacement direction of the upper slide plate, the lower resetting mechanism has an elastic force in a direction contrary to a displacement direction of the lower slide plate, and the side slide plate resetting mechanism has an elastic force in a direction contrary to a displacement direction of the side slide plate.

13. The ground fault interrupter of claim 12, wherein:

the upper slide plate is configured as a flat plate with a central opening, the lower slide plate is configured as a Z-shape, a first end of the lower slide plate penetrates the central opening such that the lower slant overlays the upper platform, the side slide plate and the projection block are adjacent the upper slide plate, the safety gate mechanism is configured such that, when a plug pin slides from an upper edge of the upper slant to a lower edge of the upper slant, the upper platform horizontally displaces a distance no less than the thickness of the plug pin, and such that when a plug pin slides from an upper edge of the lower slant to a lower edge of the lower slant, the lower platform horizontally displaces a distance no less than the thickness of the plug pin, the distance from an inner edge of the upper platform to a position on the upper slant that is at an equal height to the upper platform is no more than the distance between two load plug pins, and the distance from an inner edge of the lower platform to a lower edge of the lower slant is no more than the distance between two load plug pins.

14. A ground fault interrupter that emits an end-of-life warning, comprising:

a live load power supply line;
a neutral load power supply line;
a power unit comprising a rectifier and a filter;
a tripping coil and a fuse connected in series to the rectifier;
a leakage signal detection circuit comprising:
   a test toroidal coil;
   a neutral toroidal coil; and
   a leakage signal amplification circuit;
a tripping silicon control having at least one igniter connection and at least one other connection, the igniter connection connected to the leakage signal amplification circuit and the at least one other connection connected in series to the power supply circuit of the tripping coil;
a mechanical protection tripping mechanism;
a failure alarm circuit comprising a half-wave rectification filter circuit, a switch triode, and an optical display element,
wherein:
the power unit is configured to receive AC power from an AC power supply and to supply DC power through full wave rectification by the rectifier and filtration by the filter,
the power unit supplies power to the leakage signal amplification circuit,
the test toroidal coil and the neutral toroidal coil are connected to the leakage signal amplification circuit, and
the failure alarm circuit is connected to the DC output of the power unit.

15. The ground fault interrupter of claim 14, wherein:
the forcible tripping silicon control further comprises an igniter,
the half-wave rectification filter circuit further comprises a diode, a resistor, and a capacitor,
the switch triode further comprises a base pole, a collector and an emitter, the switch triode connected between power supplies of the rectifier and the half-wave rectification filter;
the optical display element comprises:
   an optical coupling element comprising a series arm and an output; and
   a light emitting diode connected in parallel between the collector and the emitter of the switch triode and the series arm of the optical coupling element,
the base pole of the switch triode is connected with the DC power supply of the leakage signal detection circuit through a current-limiting resistor, and
the output of the optical coupling element is connected with the igniter of the forcible tripping silicon control.

16. A ground fault interrupter that trips at its end-of-life, comprising:
a live load power supply line;
a neutral load power supply line;
a power unit comprising a rectifier and a filter;
a tripping coil and a fuse connected in series to the rectifier;
a leakage signal detection circuit comprising:
   a test toroidal coil;
   a neutral toroidal coil; and
   a leakage signal amplification circuit;
a tripping silicon control having at least one igniter connection and at least one other connection, the igniter connection connected to the leakage signal amplification circuit and the at least one other connection connected in series to the power supply circuit of the tripping coil;
a mechanical forcible tripping mechanism connected to the leakage signal detection circuit;
a forcible tripping circuit for controlling the mechanical forcible tripping mechanism, the forcible tripping circuit comprising a forcible tripping coil connected in series with a forcible tripping silicon control, which is connected to the live load power supply line and the neutral load power supply line;
a mechanical protection tripping mechanism; and
an interlock mechanism between the mechanical protection tripping mechanism and the mechanical forcible tripping mechanism;
wherein:
the power unit is configured to receive AC power from an AC power supply and to supply DC power through full wave rectification by the rectifier and filtration by the filter,
the power unit supplies power to the leakage signal amplification circuit,
the test toroidal coil and the neutral toroidal coil are connected to the leakage signal amplification circuit, and
the forcible tripping coil is connected in series to the live load power supply line and the neutral load line power supply line.

17. The ground fault interrupter of claim 16, wherein:
the mechanical protection tripping mechanism comprises:
   a middle frame;
   a resetting bar having an upper end fixable to a resetting key and a lower end comprising an annular latch groove;
   a resetting spring sleeve on the resetting bar;
   a resetting spring with a first end resting against the resetting key and a second end resting against the middle frame;
   a tubular resetting bracket with bracket arms extending symmetrically from two sides, the resetting bracket further comprising:
      a through-hole; and
      a first notch perpendicular to a center axis of the resetting bracket;
   a reverse elastic supporting mechanism coaxial with the resetting bar and the resetting bracket, the reverse elastic supporting mechanism comprising an elastic force in a direction contrary to the direction of the resetting bar, thereby forming an elastic floating and resetting mechanism for the resetting bracket;
   an electromagnetic actuator on a side of the resetting bracket, the electromagnetic actuator comprising:
      a tripping coil bracket;
      the tripping coil;
      a tripping iron core comprising an annular groove on an end facing the resetting bracket; and
      an iron core spring; and
   a latch piece with a first end having a long circular hole, the first end configured to insert into the first notch of the resetting bracket, and a second end with a second notch, the second notch configured to mate with the annular groove to form a linkage with the tripping iron core,
the mechanical forcible tripping mechanism is located on a side of the resetting bracket contrary to the electromagnetic actuator, and the mechanical forcible tripping mechanism further comprises:
   a forcible tripping iron core movably in a center of the forcible tripping coil, a main axis of the forcible tripping iron core perpendicular to a main axis of the latch piece;
   a forcible tripping iron core resetting spring; and a pulling piece with a slant, the pulling piece fixed to an upper end of the forcible tripping iron core, the resetting bar fits moveably into the center through-hole of the resetting bracket, a longitudinal axis of the electromagnetic actuator is perpendicular to a longitudinal axis of the elastic floating and resetting mechanism, the first end of the latch piece is configured to move back and forth in the first notch so as to selectively mis-align the long circular hole relative to the through-hole of the resetting bracket and relative to the annular latch groove of the resetting bar, thereby forming a bayonet switch, and the slant of the pulling piece is in front of the latch piece to form the interlock mechanism, the interlock mechanism configured to trip the mechanical protection tripping mechanism.

18. The ground fault interrupter of claim 16, wherein:

the mechanical protection tripping mechanism comprises:

a middle frame;

a resetting bar having an upper end fixable to a resetting key and a lower end comprising an annular latch groove;

a resetting spring sleeve on the resetting bar;

a resetting spring with a first end resting against the resetting key and a second end resting against the middle frame;

a tubular resetting bracket with bracket arms extending symmetrically from two sides, the resetting bracket further comprising:

a through-hole; and a first notch perpendicular to a center axis of the resetting bracket;

a reverse elastic supporting mechanism coaxial with the resetting bar and the resetting bracket, the reverse elastic supporting mechanism comprising an elastic force in a direction contrary to the direction of the resetting bar, thereby forming an elastic floating and resetting mechanism for the resetting bracket;

an electromagnetic actuator on a side of the resetting bracket, the electromagnetic actuator comprising:

a tripping coil bracket;

the tripping coil;

a tripping iron core comprising an annular groove on an end facing the resetting bracket; and an iron core spring; and a latch piece with a first end having a long circular hole, the first end configured to insert into the first notch of the resetting bracket, and a second end with a second notch, the second notch configured to mate with the annular groove to form a linkage with the tripping iron core, the mechanical forcible tripping mechanism is located on a side of the resetting bracket contrary to the electromagnetic actuator, and the mechanical forcible tripping mechanism further comprises:

a forcible tripping iron core movably in a center of the forcible tripping coil, a main axis of the forcible tripping iron core perpendicular to a main axis of the latch piece;

a forcible tripping iron core resetting spring; and a pulling piece with a slant, the pulling piece fixed to an upper end of the forcible tripping iron core, the resetting bar fits moveably into the center through-hole of the resetting bracket, a longitudinal axis of the electromagnetic actuator is perpendicular to a longitudinal axis of the elastic floating and resetting mechanism, the first end of the latch piece is configured to move back and forth in the first notch so as to selectively mis-align the long circular hole relative to the through-hole of the resetting bracket and relative to the annular latch groove of the resetting bar, thereby forming a bayonet switch, and the slant of the pulling piece is in front of the latch piece to form the interlock mechanism, the interlock mechanism configured to trip the mechanical protection tripping mechanism.

19. The ground fault interrupter of claim 16, wherein the interlock mechanism trips the mechanical protection tripping mechanism when the mechanical forcible tripping mechanism trips.

* * * * *